(12) United States Patent
Walker et al.

(10) Patent No.: US 8,442,425 B2
(45) Date of Patent: May 14, 2013

(54) SATELLITE RECEIVER PERFORMANCE ENHANCEMENTS

(75) Inventors: Glenn A. Walker, Greentown, IN (US);
Eric A. Dibiaso, Lebanon, PA (US);
Roger A. McDanell, Carmel, IN (US);
Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 13/267,505

(22) Filed: Oct. 6, 2011

(65) Prior Publication Data

US 2013/0089126 A1 Apr. 11, 2013

(51) Int. Cl.
*H04H 20/74* (2008.01)

(52) U.S. Cl.
USPC .......................................... 455/3.02; 455/222

(58) Field of Classification Search .................. 455/3.02, 455/12.1, 222, 223, 226.3, 296; 375/346, 375/254
See application file for complete search history.

(56) References Cited

U.S. PATENT DOCUMENTS

| | | | |
|---|---|---|---|
| 5,444,743 A | | 8/1995 | Scarpa |
| 5,742,639 A | * | 4/1998 | Fasulo et al. ................... 375/219 |
| 5,930,295 A | * | 7/1999 | Isley et al. ...................... 375/219 |
| 6,154,452 A | | 11/2000 | Marko et al. |
| 6,564,003 B2 | * | 5/2003 | Marko et al. ................... 386/241 |
| 6,674,401 B2 | | 1/2004 | McBurney et al. |
| 7,903,629 B2 | | 3/2011 | Walker et al. |
| 2002/0154620 A1 | | 10/2002 | Azenkot et al. |
| 2010/0135198 A1 | | 6/2010 | Shin et al. |

FOREIGN PATENT DOCUMENTS

| | | |
|---|---|---|
| EP | 0654918 A2 | 5/1995 |
| EP | 1235402 A2 | 8/2002 |

OTHER PUBLICATIONS

European Search Report dated Dec. 18, 2012.

* cited by examiner

*Primary Examiner* — Sonny Trinh
(74) *Attorney, Agent, or Firm* — Lawrence D. Hazelton

(57) ABSTRACT

Long time interleaver and listenable audio performance enhancements for a satellite receiver are presented. One enhancement includes comparing a correlation and a predetermined threshold value and blocking satellite signal data transmission from entry into long time interleaver (LTI) device circuitry and forward error correction (FEC) circuitry when the correlation value is the same as, or less than the predetermined threshold value. Another enhancement includes using Reed-Solomon codeword error checking to prevent erroneous baseband signal data from being accepted as good baseband signal data. A further enhancement includes storing symbol timing and frequency data during a strong signal condition of the satellite receiver and using this stored data when the satellite receiver encounters a weak signal condition. Another enhancement includes mitigating DC offset noise in a satellite receiver having a zero-IF tuner.

23 Claims, 14 Drawing Sheets

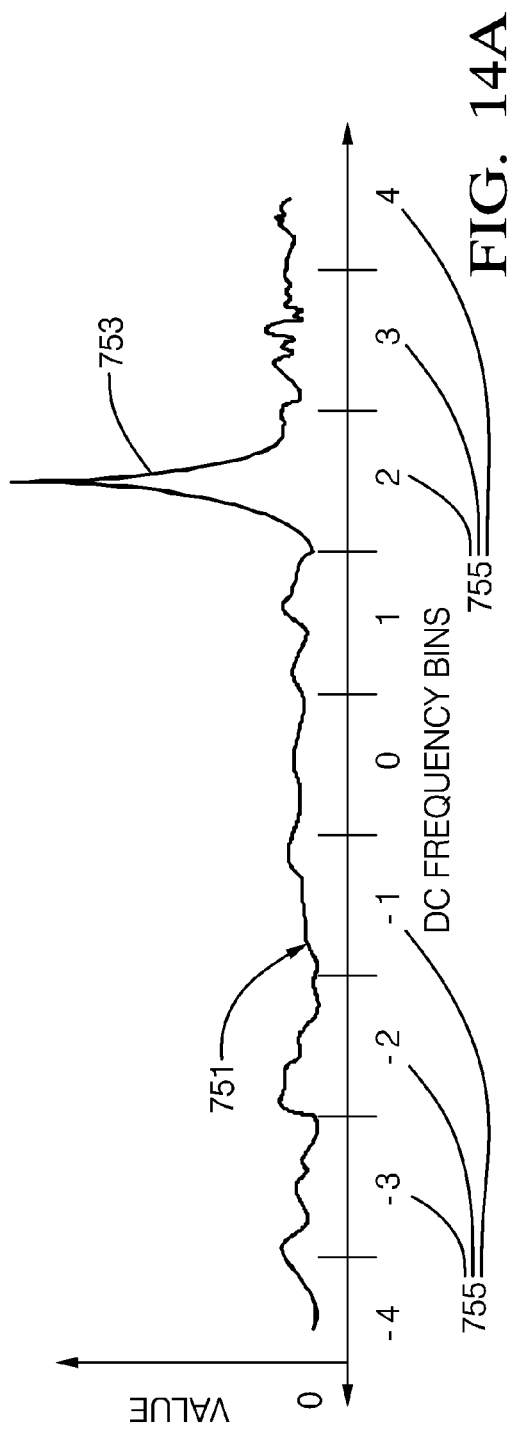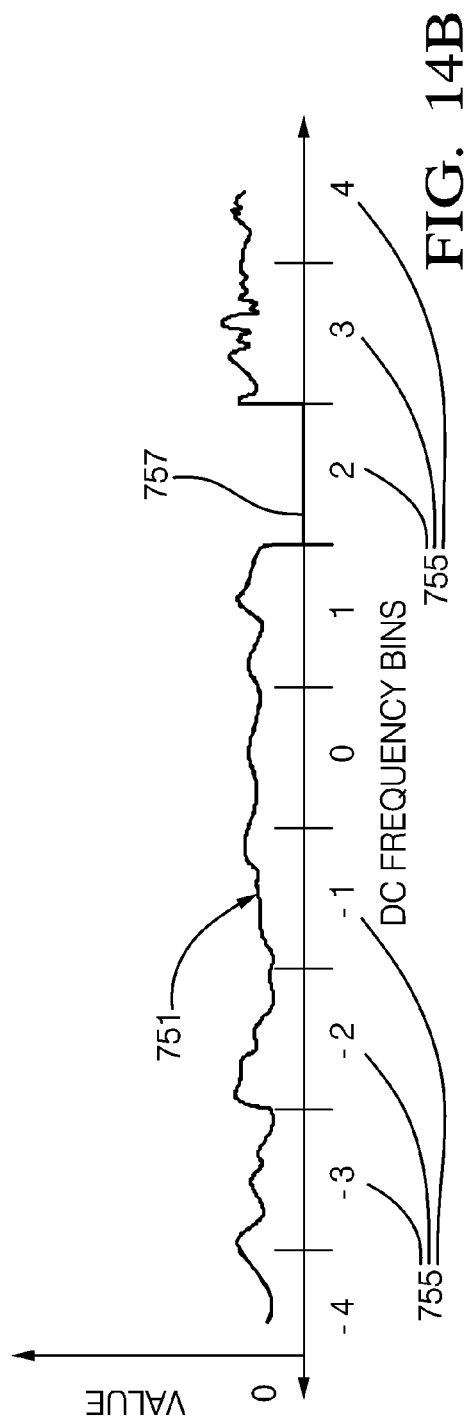

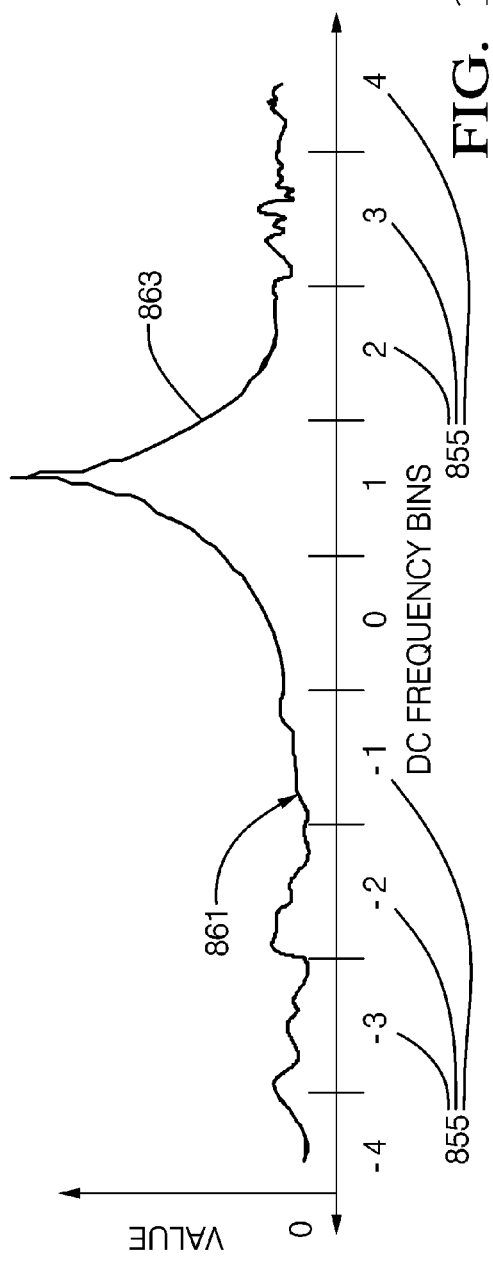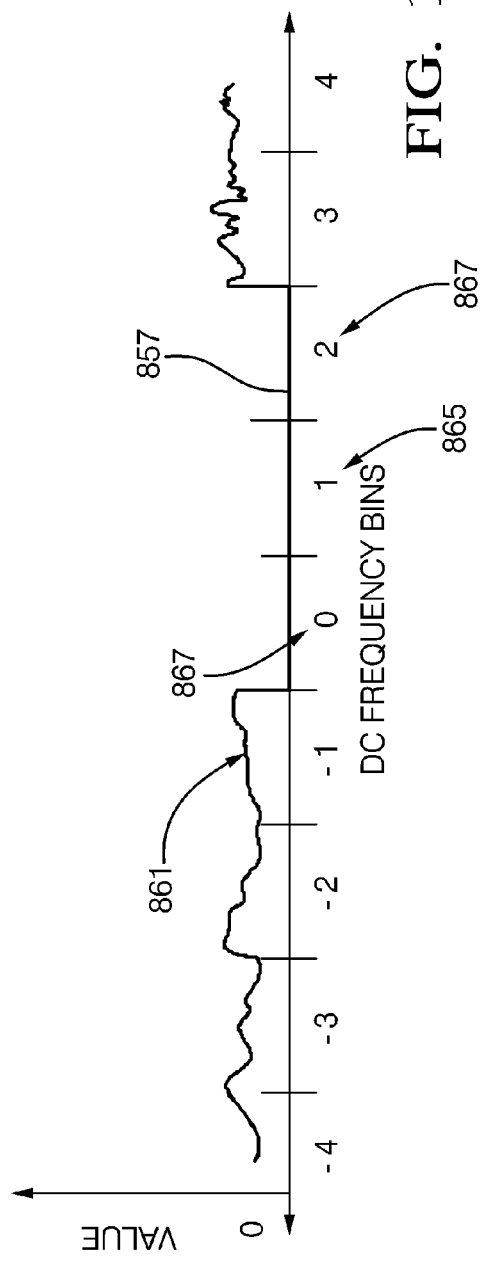

SATELLITE RECEIVER PERFORMANCE ENHANCEMENTS

TECHNICAL FIELD

This invention relates to a satellite receiver, more particularly, a satellite receiver that includes provisions that maximize a long time interleaver and enhance the audio listenability of the satellite receiver.

BACKGROUND OF INVENTION

It is known to use long time interleaving (LTI), forward error correction (FEC) and/or Direct, or Zero-IF (ZIF) tuners in satellite radios to assist in providing a quality satellite radio operating performance, which includes audio frequency performance as heard by an ear of a human operator of the satellite radio.

One task of the FEC is to assist and allow a satellite radio to recover originally transmitted satellite RF signal data with a minimum number of bit errors. Another task of a FEC may be to correct bit errors caused by channel noise or missing satellite radio frequency (RF) signal transmissions. Mathematical algorithms in the FEC often employ averaging techniques on the satellite RF signal energy over the FEC block length to provide channel noise correction. Another FEC algorithm technique may average strong RF signals to correct when RF signals are not received by the satellite receiver. Thus, the FEC assists to ensure the operator of the satellite radio has listenable subject content that might not otherwise be available. Such a scenario may occur, for example, when the operator's vehicle that includes the satellite radio enters a tunnel. One type of tunnel is experienced by the operator when the vehicle travels on a road that passes under a road overpass. When the vehicle is located in the tunnel, especially a tunnel that has an extended depth, weak satellite RF signal reception by the satellite receiver may negatively degrade, or diminish the operator's audio listening performance of the satellite radio. It is desired to further maximize satellite receiver long time interleaver performance for extended tunnel depths. Additionally, ZIF tuners are increasing being utilized in satellite radios that result in lower manufacturing costs, as the typical SAW filter previously employed is advantageously eliminated from the satellite radio circuitry. One drawback of the zero-IF tuner, however, is an increase in DC offset noise that may occur when a local oscillator (LO) signal undesirably leaks into a signal path of the satellite receiver and is subsequently frequency down-converted to baseband, or zero volts DC. Increased DC offset noise may result in an increased number of undesired listenable audio frequency interruptions, such as audio mutes, that may be heard in the listenable audio stream by the operator. As the commercial popularity of satellite radio remains constant, or even grows with consumers in the marketplace, it remains desirable to further enhance satellite radio performance wherever the satellite radio, or receiver is operated.

Thus, what is needed is a robust satellite receiver that further enhances the long time interleaver and listenable audio frequency performance for an operator of the satellite receiver. These enhancements include, but are not limited to, having enhanced long time interleaver performance when traveling through a tunnel, ensuring enhanced weak-to-strong received satellite RF signal performance using Reed-Solomon (RS) codeword error checking that prevents erroneous baseband signal data from being accepted as good baseband signal data, and eliminating DC offset noise in a satellite receiver that has a ZIF tuner.

SUMMARY OF THE INVENTION

In accordance with one embodiment of the invention, a method is presented to reduce listenable audio frequency interruptions that emit from a satellite receiver. The satellite receiver includes long time interleaver (LTI) device circuitry and forward error correction (FEC) circuitry and is configured to receive satellite radio frequency (RF) signals. One step in the method is storing a predetermined threshold value based on an electric parameter associated with the received satellite RF signals in a memory of the satellite receiver. Another step in the method is monitoring a received bit preamble associated with the received satellite RF signals by the satellite receiver. A further step in the method is comparing the received bit preamble with an expected preamble by the satellite receiver. Another step in the method is determining a received signal correlation value associated with the received bit preamble in relation to the expected preamble by the satellite receiver. A further step in the method is comparing the received signal correlation value to the predetermined threshold value stored in the memory by the satellite receiver. Another step of the method is blocking received satellite signal data transmission from entry in to an input of the LTI device circuitry by the satellite receiver when the received signal correlation value is the same as, or less than the predetermined threshold value.

Another aspect of the invention includes using Reed-Solomon (RS) codeword error checking so that erroneous baseband signal data detected by the satellite receiver is flagged as defect data in the satellite receiver.

A further aspect of the invention includes tracking and storing timing and frequency loop data during a first strong signal operating condition as identified by the satellite receiver. The data is utilized when the satellite receiver is in a weak signal condition and normal loop operation is resumed when a second strong signal condition is identified by the satellite receiver following the weak signal condition.

In yet another aspect of the invention, a satellite receiver includes a ZIF tuner and signal processing in the frequency domain where the DC frequency bins are injected with a zero value to effectively remove, or mitigate the exhibited DC offset noise. Mitigating the DC offset noise ensures undesired listenable audio frequency interruptions as heard by an operator are minimized.

Further features, uses and advantages of the invention will appear more clearly on a reading of the following detailed description of the invention, which is given by way of non-limiting example only and with reference to the accompanying drawings.

BRIEF DESCRIPTION OF THE DRAWINGS

This invention will be further described with reference to the accompanying drawings in which:

FIG. 14A shows a DC offset noise spike matched to a #2 DC frequency bin in the ZIF tuner satellite receiver of FIG. 11;

FIG. 14B shows the DC offset noise spike of FIG. 14A removed from the #2 DC frequency bin;

FIG. 15A shows a wider DC offset noise spike spread across a plurality of DC frequency bins in the ZIF tuner satellite receiver of FIG. 11; and FIG. 15B shows the wider DC offset noise of FIG. 15A removed from the plurality of DC frequency bins.

DETAILED DESCRIPTION

Figure 1:
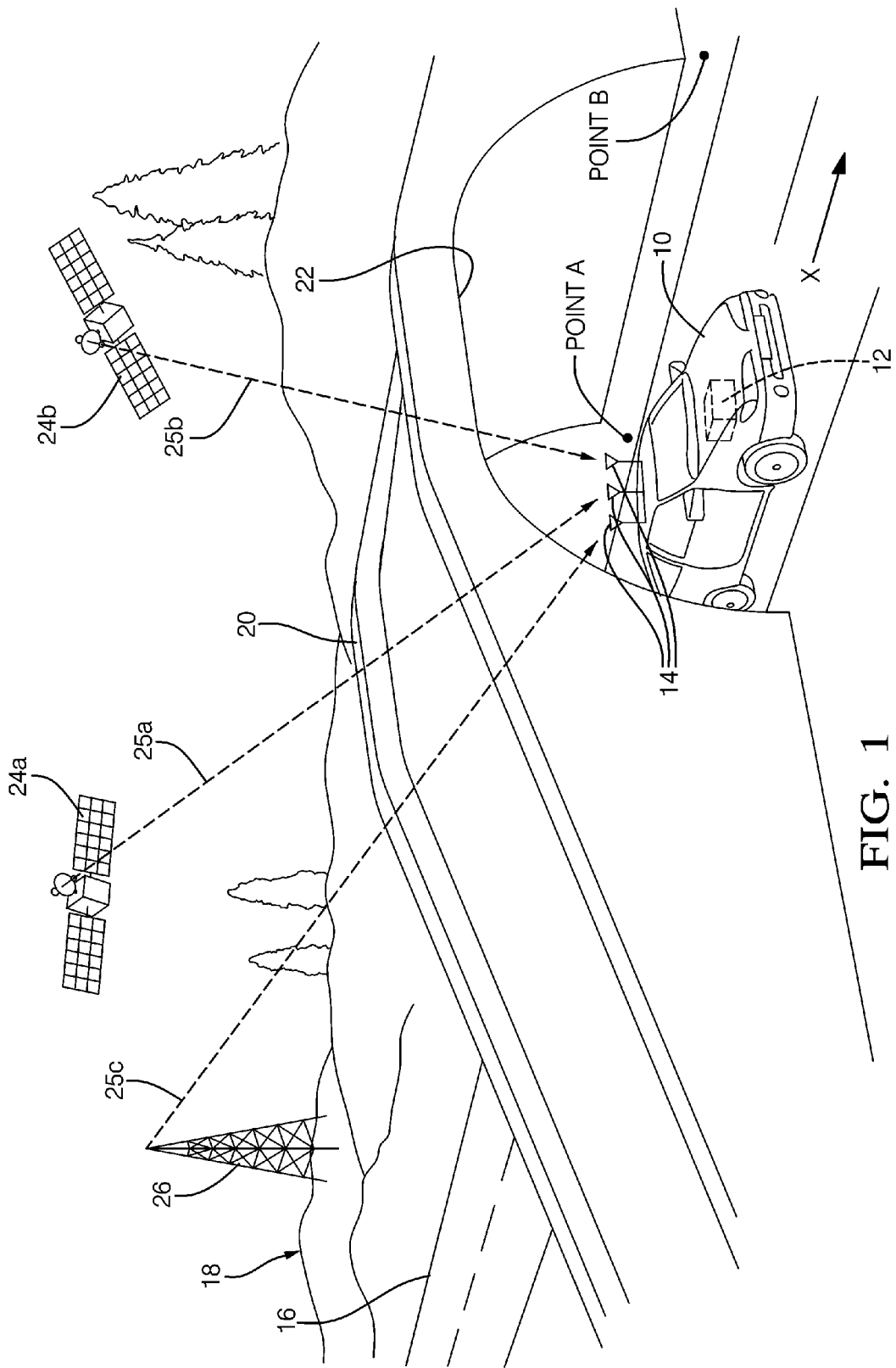
FIG. 1 shows an environmental view of a vehicle having a satellite receiver containing long time interleaver (LTI) circuitry and forward error correction (FEC) circuitry traveling along a road under an overpass, in accordance with the invention.

Satellite radio services provide pay-for service menu of listening channels that includes high-fidelity music, sports, news, and entertainment that is broadcast 24 hours per day, is commercial-free, and uncensored. Satellite radio may services may be received in a mobile configuration, such as a satellite receiver installed in a vehicle, or in a stationary environment, such as the satellite receiver being placed on a desk in an office of a building. Regardless of location, operators and users of satellite receivers enjoy listening to a meaningful satellite signal that is error-free. The satellite receiver enhancements as described herein focus on further improvements to ensure an error-free listening experience for the operator of the satellite radio.

The following terms used herein have the following definitions.

Bit slip—A bit slip refers to a loss of satellite receiver timing lock where the start of the received bit preamble is not at its expected location. The new bit or symbol location may move due to the difference in the receiver and transmitter reference clocks.

Defective listenable audio stream—A defective listenable audio stream generally may be characterized as an absence of a quality listenable audio stream. The defective listenable audio stream may include listenable audio frequency interruptions, mutes, audio drop outs, or any type of undesired anomaly that prevents a quality listenable audio stream from being attained.

Expected bit preamble—The expected bit preamble is defined by the satellite standard that the satellite receiver decodes. For instance, a couple of satellite standards/services are Sirius/XM and DVB. As the expected bit preamble is a known quantity, the expected bit preamble is stored in a memory of the satellite receiver when the satellite receiver is manufactured. Some satellite standards may include multiple preambles that are stored in the satellite receiver's memory. The expected bit preamble data generally defines the correct phase alignment of the broadcasted satellite RF signal as used by the satellite receiver when the broadcasted satellite RF signal reaches the satellite receiver.

Forward Error Correction (FEC) circuitry—FEC circuitry used to correct errors found in baseband signal data transmission in a satellite receiver.

Frequency offset algorithm—This frequency offset algorithm is disposed in the DC bin calculation block and it utilizes the frequency error signal received from the frequency shifter CORDIC to determine which DC frequency bins need to be zeroed out.

Hard bit word/data value—A hard bit is a digital indication of a binary decision, such as a TRUE decision or a FALSE decision. A hard bit word is a grouping of eight (8) hard bits into a byte designation and a hard bit word is generally composed of a digital "1's" or digital zeros ("0").

Listenable audio frequency interruptions—Any audio electrical disturbance, such as audio-frequency noise, introduced from a source external to a baseband and/or audio electrical signal of the satellite receiver that detracts the operator's satellite reciever listening experience. These listenable audio frequency interruptions may fall in an audio frequency range from about 15 Hertz (Hz) to 20 kilohertz.

Long time interleaver (LTI) circuitry—The long time interleaver circuitry generally relates to memory buffer management in the satellite receiver that is used to mitigate satellite RF signal blockages that occur between the spaced-based satellites/terrestrial repeater and the satellite receiver. A RF signal blockage may occur when a vehicle equipped with the satellite receiver enters a tunnel or heavy forested area. The memory buffer assists to provide un-interrupted high quality audio to the operator of the satellite radio when the satellite radio is actually in a weak signal condition when driving in the tunnel or the heavy forested area. For some satellite services, this memory buffer may be large enough to handle an interleaver depth of up to eight (8) or more seconds. The interleaver depth corresponds with a travel distance of a tunnel for the vehicle where high quality audio stream may be played for the operator that otherwise may be a defective listenable audio stream due to the weak signal conditions of the satellite receiver experienced from the satellite receiver being disposed in the tunnel. Thus, the long time interleaver circuitry using the neutral data values assists to spread the satellite transmitted data in the signal path of the satellite receiver out over an increased time period so that the operator has listenable audio for a longer period of time than would otherwise be available due to the satellite signal blockage.

Mute—A mute is generally any type of undesired noise disturbance. The undesired noise disturbances are listenable audio frequency interruptions that are heard through an audio output of the satellite receiver, such as a speaker, by an ear of the human operator.

Neutral data value—A neutral data value is an unbiased numerical value. An analogy of a neutral data value may be a scale that has values that range between −1 and 1. Intermediate the values of −1 and +1 is a middle value located exactly between −1 and 1. The middle value is a zero (0) value. When the scale is at the middle value of zero (0), the scale is balanced having no bias towards −1 or no bias towards +1. If the scale shifts because the neutral data value is +0.1, then the neutral data value has a bias towards +1. The neutral data value is also known as the punctured value.

Offset value (frequency offset algorithm)—The error in hertz between the frequency of the satellite transmitter reference clock and the frequency of the satellite receiver reference clock.

Predetermined threshold value—The predetermined threshold value is preferably determined before the satellite receiver is manufactured. Additionally, the predetermined threshold value is preferably stored in a memory of the satellite receiver during the manufacturing process to construct the satellite receiver. The predetermined threshold value is preferably determined by an engineering bench test using a plurality of satellite RF signals used to determine a best value for the predetermined threshold value. The predetermined threshold value is based on a sufficiently weak received RF satellite signal received by the satellite receiver having a minimum quality listenable audio stream state that occurs just before the quality listenable audio stream transitions to a defective listenable audio stream.

Quality listenable audio stream—A quality listenable audio stream is one that is absent of mutes or other undesired electrical disturbances.

Received bit preamble—When the satellite receiver is in normal operation the satellite receiver receives satellite RF signals which also includes the corresponding received bit preamble information encoded in with the baseband RF signal. The received bit preamble is subsequently stripped off during down-stream signal processing in the satellite receiver. The received bit preamble is correlated to the expected bit preamble by the satellite receiver to calculate a receiver signal correlation value during normal satellite receiver operation.

Received satellite signal data transmission—This term refers to the digital baseband signal in the signal path of the satellite receiver.

Received signal correlation value—The received bit preamble is correlated to the expected bit preamble by the satellite receiver to calculate a receiver signal correlation value during normal satellite receiver operation.

Corrected value (RS codeword)—The corrected value is a value given by the RS decoder during RS decoder operation.

Corrected RS codeword—The corrected RS codeword is a value given by the RS decoder during RS decoder operation that corrects any portion of the entire RS codeword up until a maximum correction capability.

Known transmitted preamble value (RS codeword)—The known transmitted preamble value is a known value understood by the satellite receiver.

Reed-Solomon (RS) codeword—The RS codeword is an output of the RS encoder and is further analyzed in an RS decoder disposed in the satellite receiver. The RS decoder is part of the FEC circuitry.

RS codeword preamble—A portion of the RS codeword that is used by the satellite receiver.

RS decoder—A circuit block in the FEC circuitry.

Received value—A value of the RS preamble or RS codeword at a particular point in time.

Signal path—A signal path is an electrical transmission route that a baseband electrical signal follows through the satellite receiver en route to being audibly reproduced by a speaker of the satellite radio. The baseband signal may be an analog baseband signal that generally starts on the signal path of the satellite receiver after the phase shift mixers in the front end of the satellite receiver. The analog baseband signal transitions to a digitally represented baseband signal on the signal path at an output of the analog-to-digital converters (ADC). The ADCs are disposed on the signal path downstream from the phase shift mixers. The DSP of the satellite receiver further processes the digital baseband signal along the signal path of the satellite receiver.

Soft bit word/data value—A soft bit digital word is a higher resolution representation of a hard bit in that a soft bit word is one that describes a plurality of data values within a defined range of values and may include a middle value. For example, a satellite receiver may have soft bit words that have a range of values between −1 and +1 with a middle value of zero (0). Utilizing soft bit data values is a satellite receiver dramatically increases the effectiveness of the FEC algorithms.

Static state (of frequency and timing loops)—The static state of the timing and frequency loop is where the satellite receiver does not allow these respective loops to operate using another value other than the value stored in the memory.

Strong received signal condition—A strong received signal condition of the satellite receiver is that which includes a quality listenable audio stream. A strong signal condition has a very high received signal correlation value.

Intermediate received signal condition—An intermediate received signal condition still has a quality listenable audio stream, but the intermediate signal condition has a moderate to weak received signal correlation value.

Weak received signal condition—A weak received signal condition of the satellite receiver is that which includes a defective listenable audio stream. A weak received signal condition has a low received signal correlation value in contrast to the correlation value in a strong received signal condition.

Figure 2:
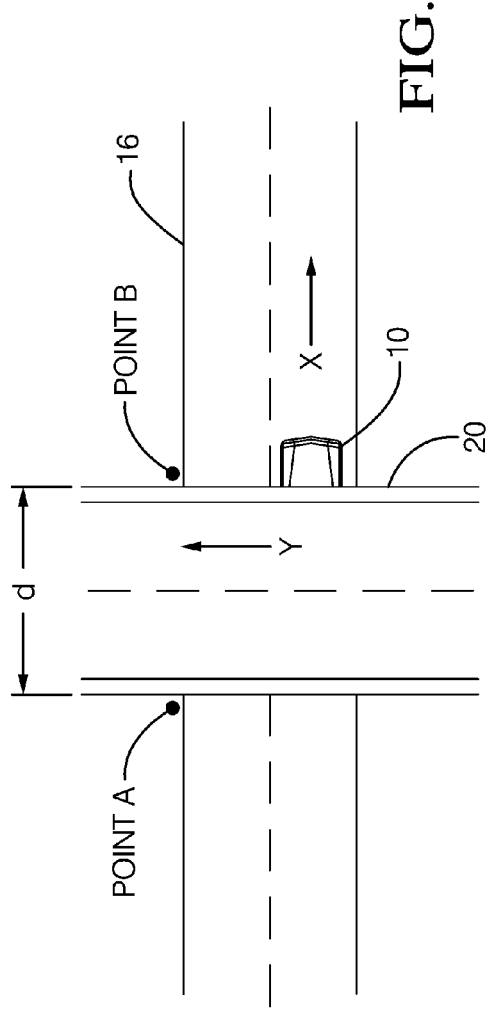
FIG. 2 shows a plan view of the overpass of FIG. 1, showing time interleaver depth details thereof.

In accordance with an embodiment of the invention, referring to FIG. 1, a vehicle 10 includes a satellite receiver 12 disposed in vehicle 10. Satellite receiver 12 is in electrical communication with a plurality of antennas 14. Vehicle 10 is traveling along a road 16 in a forward direction x in a ground-based earth environment 18 that further includes an overpass road, or overpass 20 that overlies road 16. Overpass 20 allows other motorized vehicles to travel in a transverse direction y over road 16 without further delay, such as may be imposed if a stop sign or stoplight was incurred adjacent road 16. The area disposed underlying overpass 18 forms a tunnel 22 for vehicle 10. Referring to FIGS. 1 and 2, vehicle 16 enters tunnel 22 at point A movingly traveling in a forward direction x and exits tunnel at point B. A distance d is defined between point A and point B. Vehicle antennas 14 respectively electrically communicate with spaced-based satellites 24a, 24b and a land-based terrestrial antenna 26. Satellites 24a, 24b generally movingly operate, or orbit in a space-based environment that overlies ground-based earth environment 18, as is known in the satellite arts. Satellites 24a, 24b broadcast satellite RF signal frequencies 25a, 25b into ground-based earth environment 18 and terrestrial antenna 26 broadcasts ground-based satellite RF signal frequencies 25c in to ground-based earth environment 18.

When vehicle 10 is driving in tunnel 22, the physical structure of tunnel 22 may undersirably provide an impediment for satellite receiver 12 to adequately receive broadcast satellite RF signal frequencies 25a-c such that a strong received RF signal condition of the satellite receiver is realized. It is desired to have a quality listenable audio stream emit from satellite receiver 12 at any point in tunnel 22 along distance d of road 16. Distance d may also be known as the effective interleaver depth. As illustrated in FIGS. 1 and 2, distance d is a relative short distance. Other overpass tunnels may have a much longer interleaver depth. In one embodiment, the interleaver depth of the tunnel may be such that it may take eight (8) seconds or more for the vehicle to drive through the tunnel before exiting.

Figure 3:
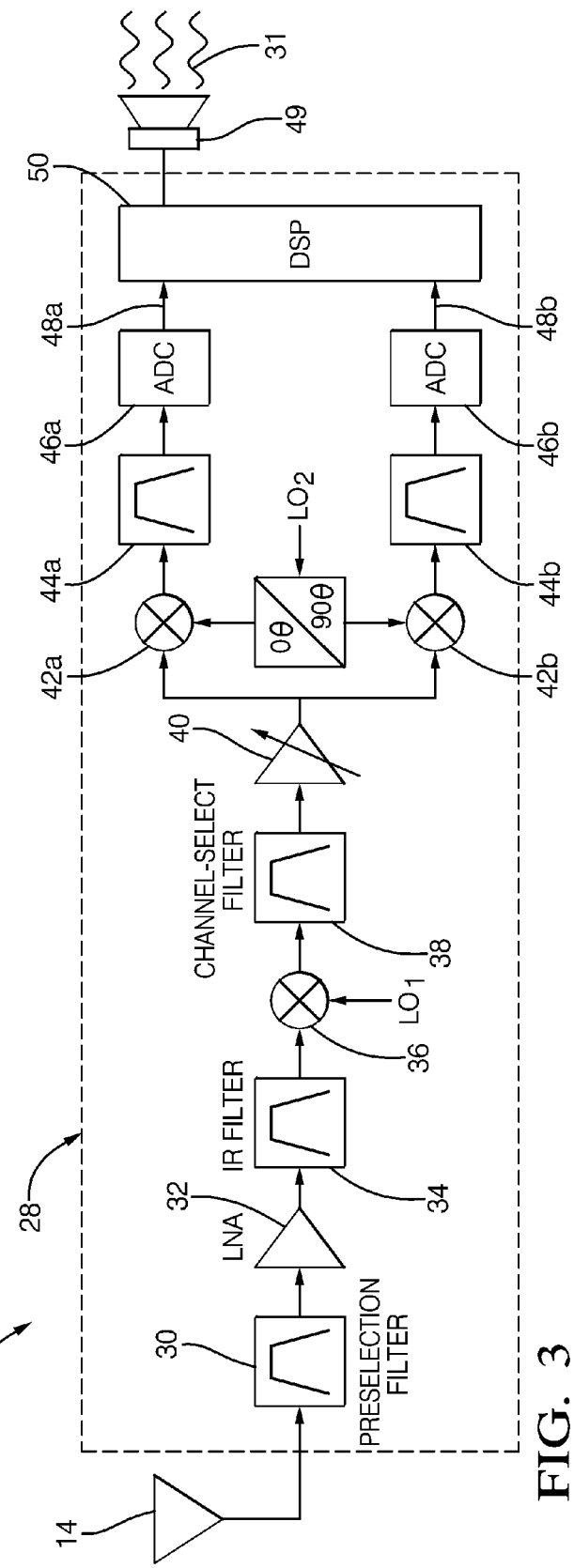
FIG. 3 shows a block diagram of a superheterdyne front end of the satellite receiver of FIG. 1.

Referring to FIG. 3, a front end 28 of satellite receiver 12 is illustrated. Front end 30, along with other portions of satellite receiver 12 are constructed of printed circuit boards (PCBs) that include electrical circuits made from any electrical type device, such as diodes, resistors, capacitors, relays, and transistors as is known in the satellite receiver arts. The PCBs may be formed from FR4 material. The PCBs are assembled and fastened in one or more housings made of solid material such as metal or plastic. The portion of satellite receiver 12 shows at least a front end 28 of satellite receiver 12. For simplicity, only one antenna 14 in FIG. 3 is shown that generally represents plurality of antennas 14 attached to vehicle 10, as illustrated in FIG. 1. Front end 28 includes antenna 14, a preselection filter 30, a low noise amplifier (LNA) 32, an image rejection (IR) filter 34, and a first mixer 36. Receiver 12 receives at least one of satellite RF signals 25a-c and antenna 14 electrically couples these signals in to satellite receiver 12. Preselection filter 30 removes out of band energy as well as partially reject image band received satellite RF signals. LNA 32 provides gain while also suppressing the contribution of noise from the succeeding stages. The image reject (IR) filter attenuates the RF signals at image band frequencies coming from LNA 32. First mixer 36 down-converts the satellite RF signals by mixing with a first local oscillator signal $LO_1$ to a first IF frequency. Channel select filter 38 selects a smaller satellite frequency band while rejecting other adjacent RF frequencies which could interfere with the RF signal selection. Channel select filter 38 is also critical in determining satellite receiver sensitivity and selectivity. Another amplifier 40 provides selectable gain to the operator's selected channel that is input to phase shift mixers 42a, 42b. One of the phase shift mixers 42a phase shifts the analog RF signal by zero degrees and the other one of the phase shift mixers 42b phase shifts the signal by 90 degrees to produce in-phase (I) and quadrature (Q) signal components. The respective phase shifted signals 42a, 42b are then low pass filtered (LPF) by LPF filters 44a, 44b which act as a channel reject filter and are used for anti-aliasing functionality and then are converted from respective analog baseband signals to digital baseband signals by A-to-D converters (ADCs) 46a, 46b. The respective digital baseband signals are output in a signal path 48a, 48b of satellite receiver 12 in to digital signal processor (DSP) 50. A speaker 49 is electrically coupled to DSP 50 and plays a listenable audio stream 31 of a selected signal of received RF signals from broadcasted RF signals 25 that is heard by the operator. Other alternative front end configurations to process the analog satellite RF signals to digital base band signals are left to the artesian. The satellite receiver performance enhancements as described herein are associated with features and functionality disposed in DSP 50. Satellite receiver 12 is a dual conversion architecture with a first IF stage that converts the received satellite RF signal to an first IF frequency and a second IF stage that converts the received satellite RF signal from the first IF frequency down to a baseband signal at zero (0) volts DC.

Figure 4:
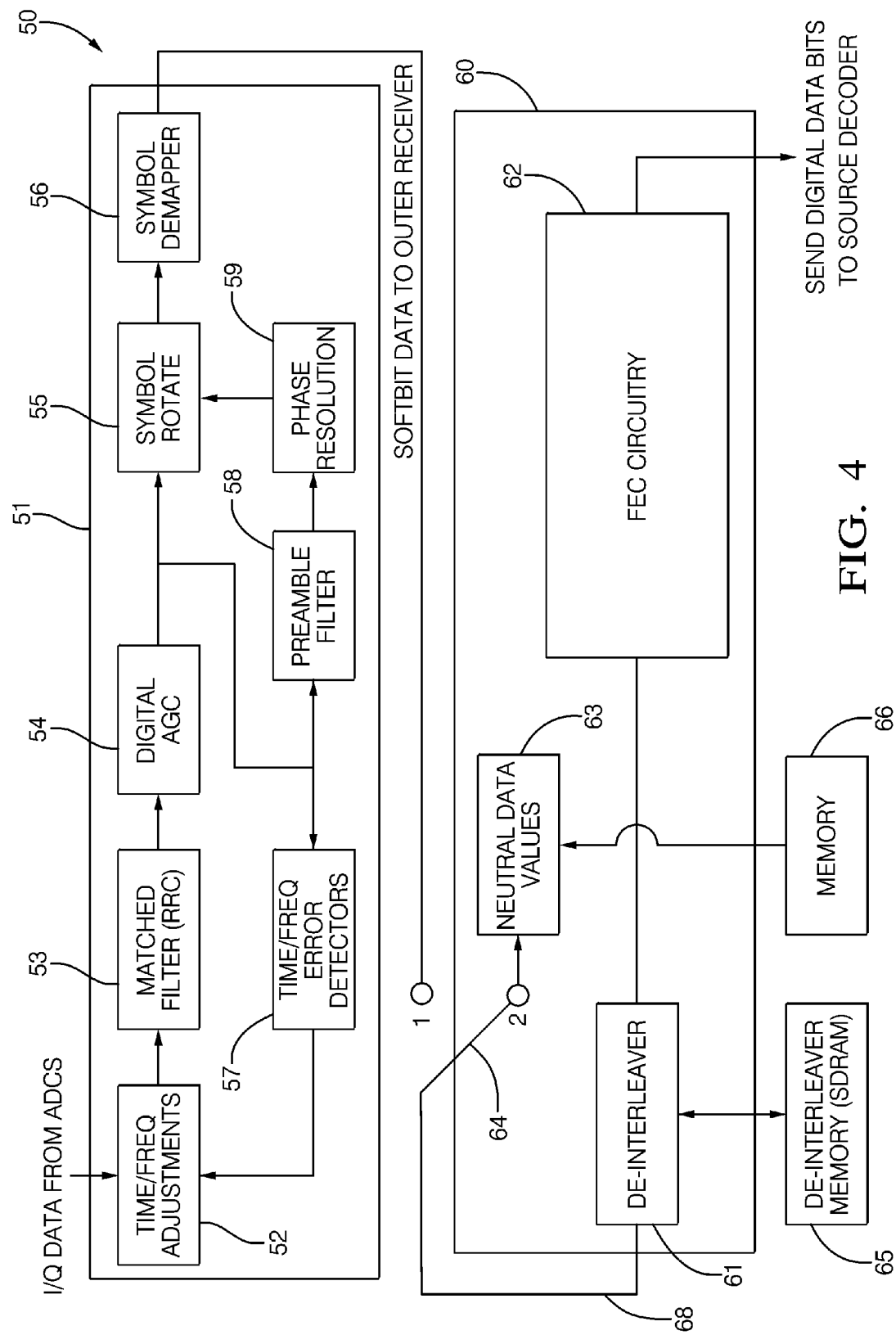
FIG. 4 shows a block diagram of at least a portion of a digital signal processor (DSP) of the satellite receiver of FIG. 1.

Referring to FIG. 4, DSP 50 includes an inner receiver portion 51 and an outer receiver portion 60 for each respective digital base band signal received along signal path 48 from A/D convertors 46. Inner receiver 51 conducts additional signal processing on the received baseband signal after being digitized by ADCs 46a, 46b. Inner receiver 51 includes the following functional blocks: time/frequency adjustment block 52, matched filter (RRC) block 53, digital AGC 54, symbol rotate block 55, and a symbol demapper block 56. The output of digital AGC block 54 has a feedback loop that contains a time/frequency error detectors block 57. Digital AGC 54 is also forwardly electrically transmitted into a forward loop in to a preamble filter 58 and a phase resolution block 59 that is electrically transmitted in to symbol rotate block 55.

A brief function description of inner receiver 51 will now be described. Time/Freq Adjustments block 52, receives the digital baseband signal carried on signal path 48 from ADC 46. Time/Freq Adjustments block 52 makes necessary corrections to the digital baseband signal based on the input signals from error detectors 57. These adjustments are necessary to match the different transmitter and receiver reference clocks. A time/freq corrected digital baseband signal is then transmitted to matched filter 53. Matched filter 53 provides the maximum signal-to-noise power ratio at an output of matched filter 53 for a given transmitted RF signal. Receiver 12 may use a Root Raised Cosine filter as a transmit and receive filter as is known in the satellite receiver art. Digital AGC 54 receives the matched filter output and makes any necessary signal power adjustments. Digital AGC 54 optimizes the power levels for downstream blocks 55, 56. Time/Freq error detectors 57 examine the digital baseband signal from ADCs 46 to calculate a time and a frequency error signal. The time and the frequency error signals are filtered and then sent to time/freq adjustments block 52 to make the corresponding time/frequency adjustments to the digital base band signal. An output from digital AGC 54 is an input to preamble filter 58. Preamble filter 58 searches the digital baseband signal for the received preamble by correlating the input data with the known preamble stored in a memory of satellite receiver 12. Once an acceptable preamble correlation is found, the correlated value is output to phase resolution block 59. Phase resolution block 59 determines the phase ambiguity of the incoming digital baseband signal, and generates an output to correct the phase offset. The phase correction output is input to symbol rotate block 55 along with the received signal from digital AGC 54. Symbol rotate block rotates the signal in phase by the value calculated in phase resolution block 59. The phase rotated signal is then input to symbol demapper 56 which transforms the received constellation of I and Q data steams to a single softbit data steam. Symbol demapper 56 is the last block in inner receiver 51. An output of symbol demapper 56 leaves inner receiver 51 and is electrically transmitted to outer receiver 60.

Outer receiver 60 includes a de-interlever block 61 and forward error correction (FEC) block, or circuitry 62. De-interleaver block 61 is also defined as the long time interleaver (LTI) circuitry. De-interleaver 61 manages data flow that is presented to FEC circuitry 62 and read/writes data bits to de-interleaver memory 65. The digital baseband signal carried on signal path 68 is electrically output from the symbol demapper block A56 to an input of de-interleaver block 61 which further electrically transmits the digital baseband signal into FEC circuitry 62. De-interlever block 61 is in electrical communication with de-interleaver memory (SDRAM) 65. De-interleaver memory 65 is disposed external to DSP 50 as the size of this memory may be upwards of 128 megabytes in size. The size of de-interleaver memory 65 is dependent on the effective interleaver depth that is desired to be accommodated and is dependent on the electrical application where the satellite receiver is utilized. In one electrical application, the de-interleaver size is sufficiently large to an interleaver depth that is traveled by the vehicle in eight (8) seconds of time. Outer receiver portion 60 also includes a neutral data values block 63. A switch 64 disposed in signal path 68 inside of DSP 50 switches signal path 68 between an output of symbol demapper 56 and an output of neutral data block 63. Neutral data values block is also in electrical communication with a memory 66. Memory 66 is disposed in DSP 50, and generally has a size of about 2 kilobytes.

Figure 5:
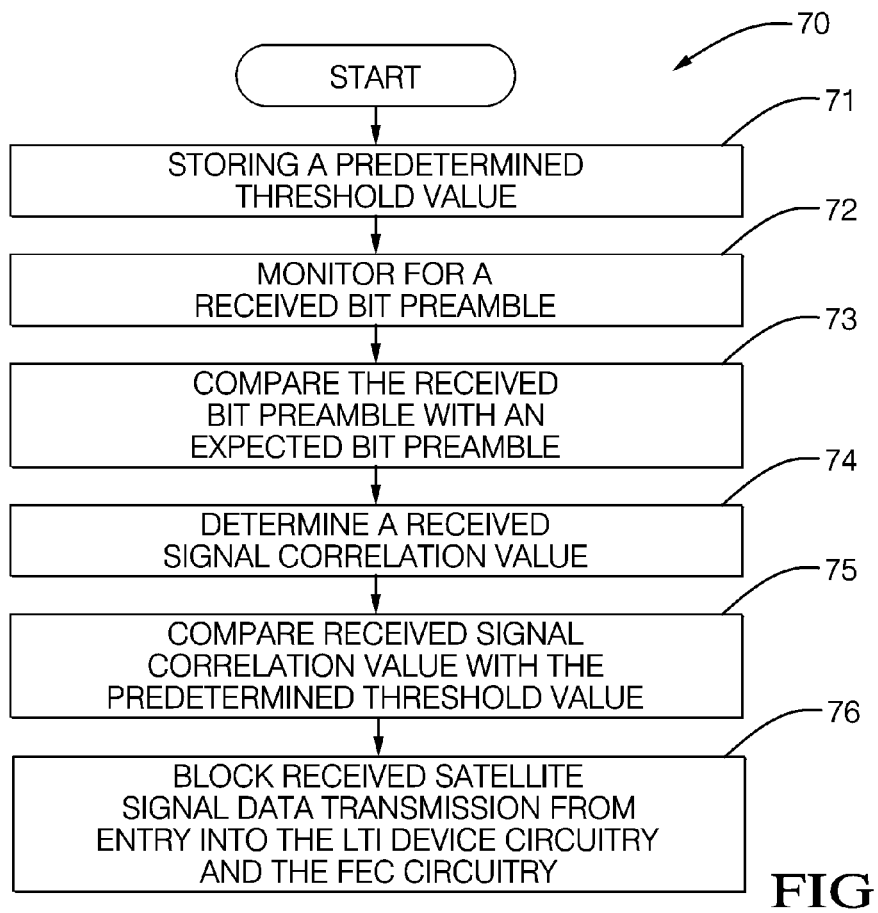
FIG. 5 shows a method to reduce listenable audio frequency interruptions that emit from the satellite receiver of FIG. 1.

Referring to FIG. 5, a method 70 to reduce listenable audio frequency interruptions that emit from satellite receiver 12 having including long time interleaver (LTI) device circuitry 61 and forward error correction (FEC) circuitry 62. One step 71 in method 70 is storing a predetermined threshold value based on an electric parameter associated with the received satellite RF signals through antenna 14 an in to satellite receiver 12 from broadcast satellite RF signals 25 in a memory of satellite receiver 12. A further step 72 in method 70 is monitoring a received bit preamble associated with the received satellite RF signals by satellite receiver 12. Another step 73 in method 70 is comparing the received bit preamble with an expected preamble by satellite receiver 12. Another step 74 in method 70 is determining a received signal correlation value associated with the received bit preamble in relation to the expected preamble by satellite receiver 12. A further step 75 in method 70 is comparing the received signal correlation value to the predetermined threshold value by satellite receiver 12. Another step 76 in method 70 is blocking received satellite signal data transmission from entry in to an input of the LTI device circuitry 61, 65 and an input of FEC circuitry 62 by satellite receiver 12 when the received signal correlation value is the same as, or less than the predetermined threshold value. As illustrated in FIG. 5, switch 64 is switched to an output of neutral value block 63 at position #2 from position #1. DSP 50 ensures neutral data values are read from memory that correspond to correlation values that are the same or below the received signal correlation value. The de-interleaver may process a block of symbols at a time that would each have the neutral value. Alternately, the de-interleaver may process any amount of symbols as required in an electrical application.

Outer receiver portion 60 of DSP 50 operates in soft bit words having a discrete digital value. For example, when the range is between −1 and +1, the neutral data value is zero (0) which is the mid-point value between −1 and +1. The neutral data value of zero, while being represented as a digital value, has zero weight. Zero weight means the zero value is not biased towards −1 or biased towards +1. When the received signal correlation value is greater than the predetermined value as determined by DSP 50, switch 64 allows de-interleaver 61 to be in electrical communication with the output of symbol demapper 56. When satellite receiver 12 detects a strong signal condition which is a normal operating condition for satellite receiver 12, switch 64 is in electrical communication with symbol demapper 56.

When de-interleaver 61 is filled with neutral data values versus a digital baseband signal that has noise, listenable audio stream 31 will recover faster from the weak signal condition of overpass 20, by advantageously reducing the number of mutes and the total time of a mute when exiting from overpass 20. Inputting the neutral values maximizes the effective interleaver depth d by not inserting and then processing noisy signal data in FEC circuitry 62. When noisy signal data is not processed noisy signal data is advantageously not generated at an output of FEC circuitry 62.

When the received signal correlation value is greater than the predetermined threshold value the received satellite signal data transmission is input to LIT circuitry 61 and the FEC circuitry 62 by switch 64 being switchingly moved to position #1.

Figure 6:
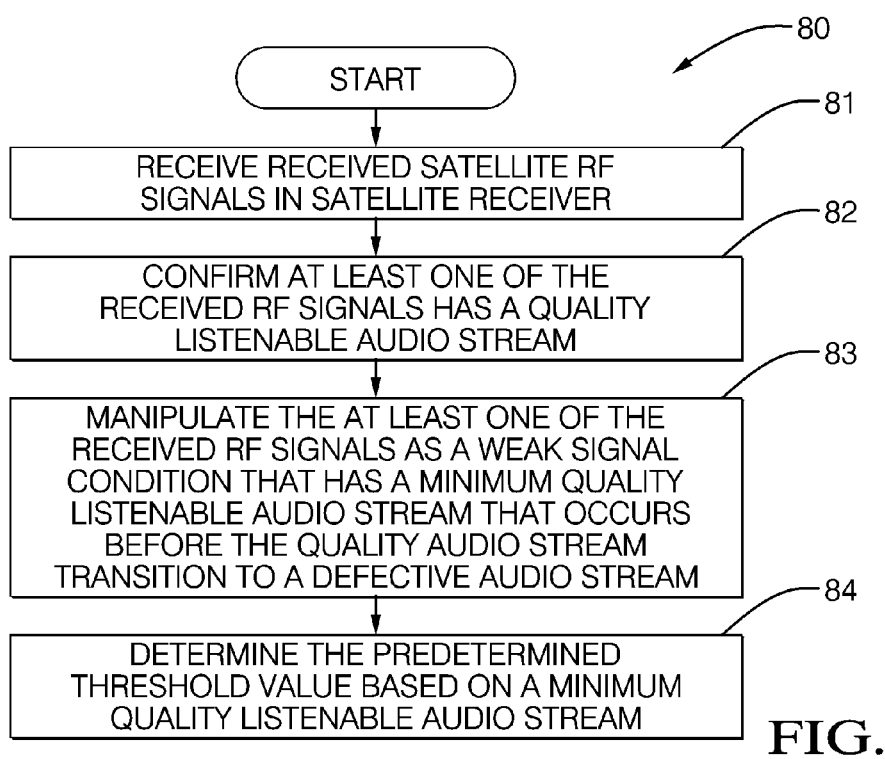
FIG. 6 shows a method to determine a predetermined threshold value used in the method of FIG. 5.

Preferably, the predetermined threshold value is determined before construction of satellite receiver 12 by an engineering bench test method 80. Referring to FIG. 6, one step 81 in method 80 is receiving the received satellite RF signals in satellite receiver 12. Another step 82 in method 80 is confirming that at least one of the received satellite RF signals has a quality listenable audio stream in satellite receiver 12. A further step 83 in method 80 is manipulating the at least one of the received satellite RF signals as a sufficiently weak received satellite RF signal having a minimum quality listenable audio stream state that occurs just before the quality listenable audio stream 31 transitions to a defective listenable audio stream in satellite receiver 12. Another step 84 in method 80 is determining the predetermined threshold value based on the minimum quality listenable audio stream state. The minimum quality listenable audio stream state is the electric parameter described in method 70 as illustrated in FIG. 5.

Figure 7:
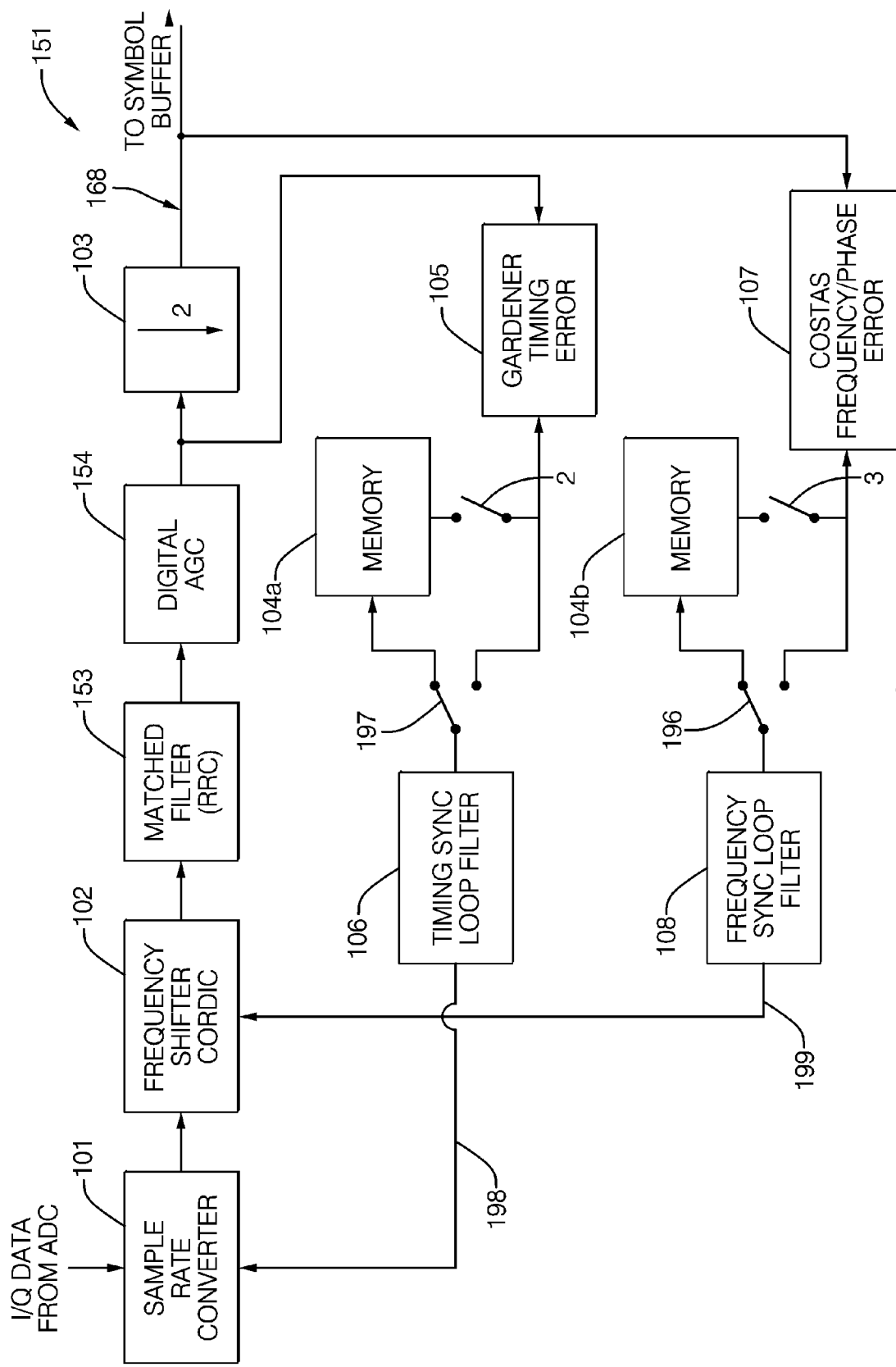
FIG. 7 shows an inner portion of a DSP in a satellite receiver that is disposed electrically upstream from a de-interleaver block that includes a timing and a frequency loop, according to alternate embodiment of the invention.

Referring to FIG. 7, in an alternate embodiment enhancement of the invention, an inner receiver portion 151 in the DSP includes a timing loop 198 and a frequency loop 199. Elements in FIG. 7 that are similar to the embodiment of FIG. 4 have reference numerals that differ by 100. A signal path 168 further includes a sample rate converter 101, a frequency shift CORDIC 102, and a decimate by 2 block 103. A matched filter 153 and a digital AGC 154 are similar elements to those shown in the embodiment of FIG. 4. Timing loop 198 includes a timing sync loop filter 106, a switch 197, a memory 104a, and a Gardner Timing Error block 105. Switch 197 switches between an output of memory 104a and an output of Gardner timing error block 105. Frequency loop 199 includes a carrier sync loop filter 108, a switch 196, a memory 104b, and a Costas Frequency/Phase Error block 107. Garner and Costas blocks 105, 107 are known in the satellite receiver arts. Switch 196 switches between an output of memory 104b and an output of Costas frequency/phase error block 107. Timing loop 198 further includes a timing loop memory switch 2. Frequency loop 199 includes a frequency loop memory switch 3. Switches 2, 3 disconnect from respective memories 104a, 104b before switches 197, 198 switchingly move from position #1 to position #2. Switches 2, 3 are in an OPEN position so as to not be in electrical communication with respective memories 104a, 104b when the satellite receiver is in a weak signal operating condition. Switches 2, 3 are in a CLOSED position and are in electrical communication with memories 104 when the satellite receiver is in a strong signal operating condition. Memories 104 store a last known good value associated with a strong signal condition before the satellite receiver enters a weak signal condition that may again be used when the satellite again enters a strong signal condition as would be the situation as vehicle 10 exits overpass 20 at Point B, as best illustrated in FIG. 1. Memories 104a, 104b generally hold a single value that represents the last known strong signal condition. The single value may be stored as an 8, 16, or 32-bit word. Switches 197, 198 are again switched to their respective position #1 during a strong signal condition as then the most recent real-time good value is supplied by error blocks 105, 107. Switches 197, 198 work in tandem and switches 2, 3 work in tandem to keep loops 198, 199 operatively synched together. When switches 2, 3 operate in position #2 during a weak signal condition of the satellite receiver, as illustrated in FIG. 7, neutral values block 63 operates in position #2 as illustrated in FIG. 4.

Timing error block 198 is effective to keep that satellite transmitter and receiver clocks as closely matched as possible. When the clocks are closely matched, timing errors are minimized in the satellite receiver. Frequency error block 199 is effective to minimize frequency error between the satellite transmitter and receiver carrier frequencies. The error is minimized when the baseband frequency is at DC or zero (0) hertz. If the drift errors are numerous the timing and frequency loops may take longer to lock which may result in mutes occurring in the listenable audio stream of the satellite receiver.

Figure 8:
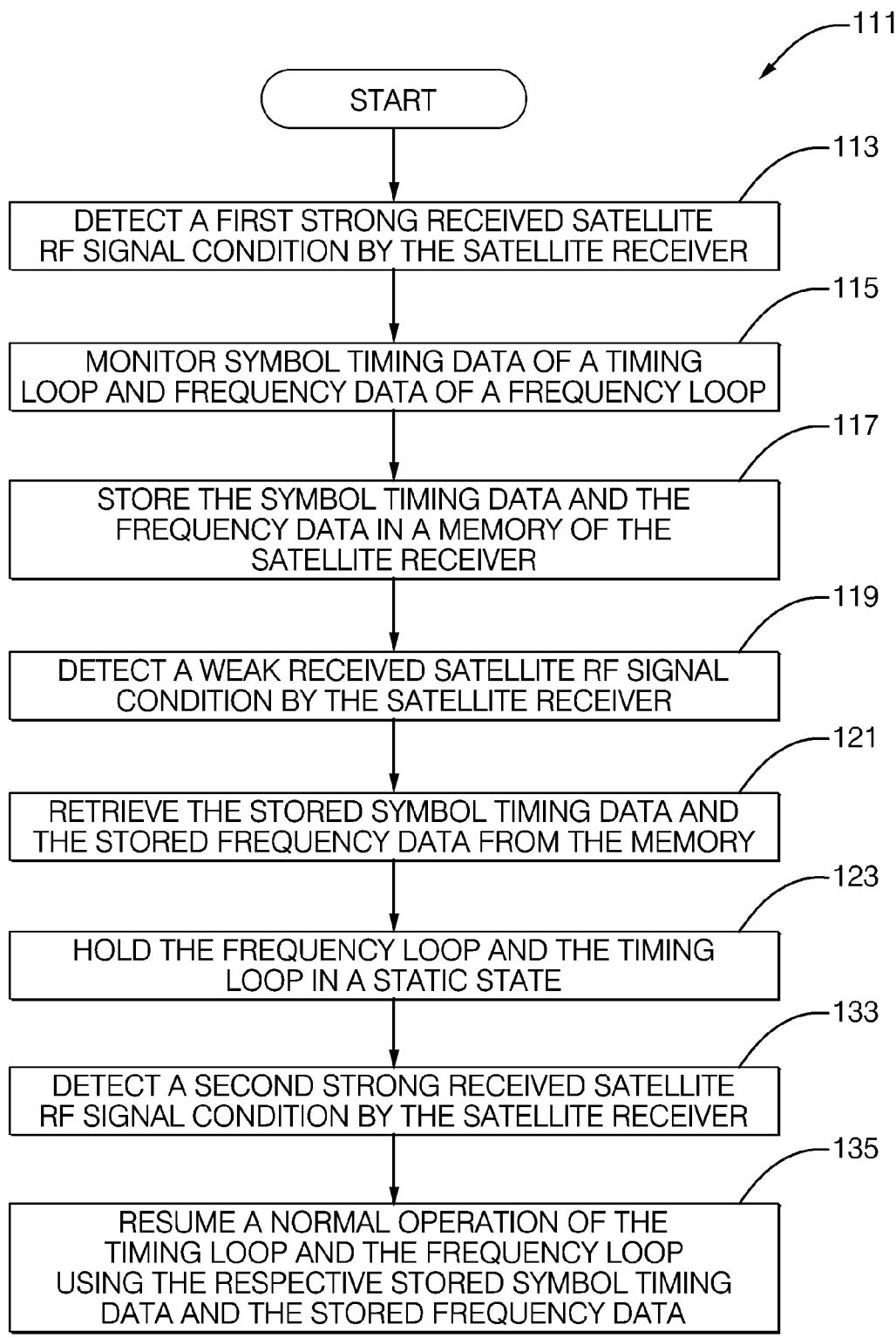
FIG. 8 shows a method of operating a timing loop and a frequency loop for the satellite receiver of FIG. 7.

Referring now to FIG. 8, a method 111 of operation of loops 198, 199 shall now be described. One step 113 in method 111 is detecting a first strong received satellite RF signal condition by the satellite receiver. Another step 115 in method 111 is monitoring symbol timing data of timing loop 198 and frequency data of frequency loop 199 disposed in the satellite receiver by the satellite receiver when the satellite receiver is in the first strong signal condition. A further step 117 in method 111 is storing the symbol timing data and the frequency data in memory 104a, 104b of the satellite receiver by the satellite receiver. Another step 119 in method 111 is detecting a weak received satellite RF signal condition by the satellite receiver. A further step 121 in method 111 is retrieving the stored symbol timing data and the stored frequency data from memory 104a, 104b by the satellite receiver when the satellite receiver is in the weak signal condition. Another step 123 in method 111 is holding timing loop 198 and frequency loop 199 in a static state by the satellite receiver during the weak signal condition with the respective stored symbol timing data and the frequency data. A further step 133 in method 111 is detecting a second strong received satellite RF signal condition after the step of detecting the weak signal condition. Another step 135 in method 111 is resuming a normal operation of timing loop 198 and frequency loop 199 with the respective stored symbol timing data and the frequency data after step 133 of detecting the second strong signal condition. Alternately, only the timing loop may be employed in an specific electrical application. Still yet alternately, only the frequency loop may be employed in a specific electrical application. When either the timing loop or the frequency loop are singularly employed without the other loop being present, the method of operation for the single used loop is similar to that of method 111. When satellite receiver 12 returns to a strong signal condition the determination of when the strong signal condition has returned is based on the received bit preamble correlation. Method 111 advantageously prevents loops from having drift error during the weak signal condition that may otherwise corrupt the signal and potentially cause mutes to be heard by the operator as previously described herein.

The method 111 advantageously assists satellite receiver 12 to more quickly recover from a weak signal condition when a new strong signal condition is presented such as may occur when vehicle 12 exits overpass 20 at point B, as illustrated in FIG. 1. Using good values stored in memory 104a, 104b for operation of timing and frequency loop 198, 199 ensures a quick relock of loops 198, 199 so good bits are available sooner to be sent in to de-interleaver 61 so that de-interleaver may provide good data an ensure a maximum possible interleaver depth to be attained. This means a quality listenable audio stream from satellite receiver 12 is available to be heard by the operator for a longer time. Bit slips are also minimized as there is less noisy data available to cause them. When loops 198, 199 are held constant by satellite receiver 12 during times of weak or noisy RF signal conditions, and only the last known good values are used in loops 198, 199 coming out of the weak signal condition, bit slips are minimized.

Figure 9:
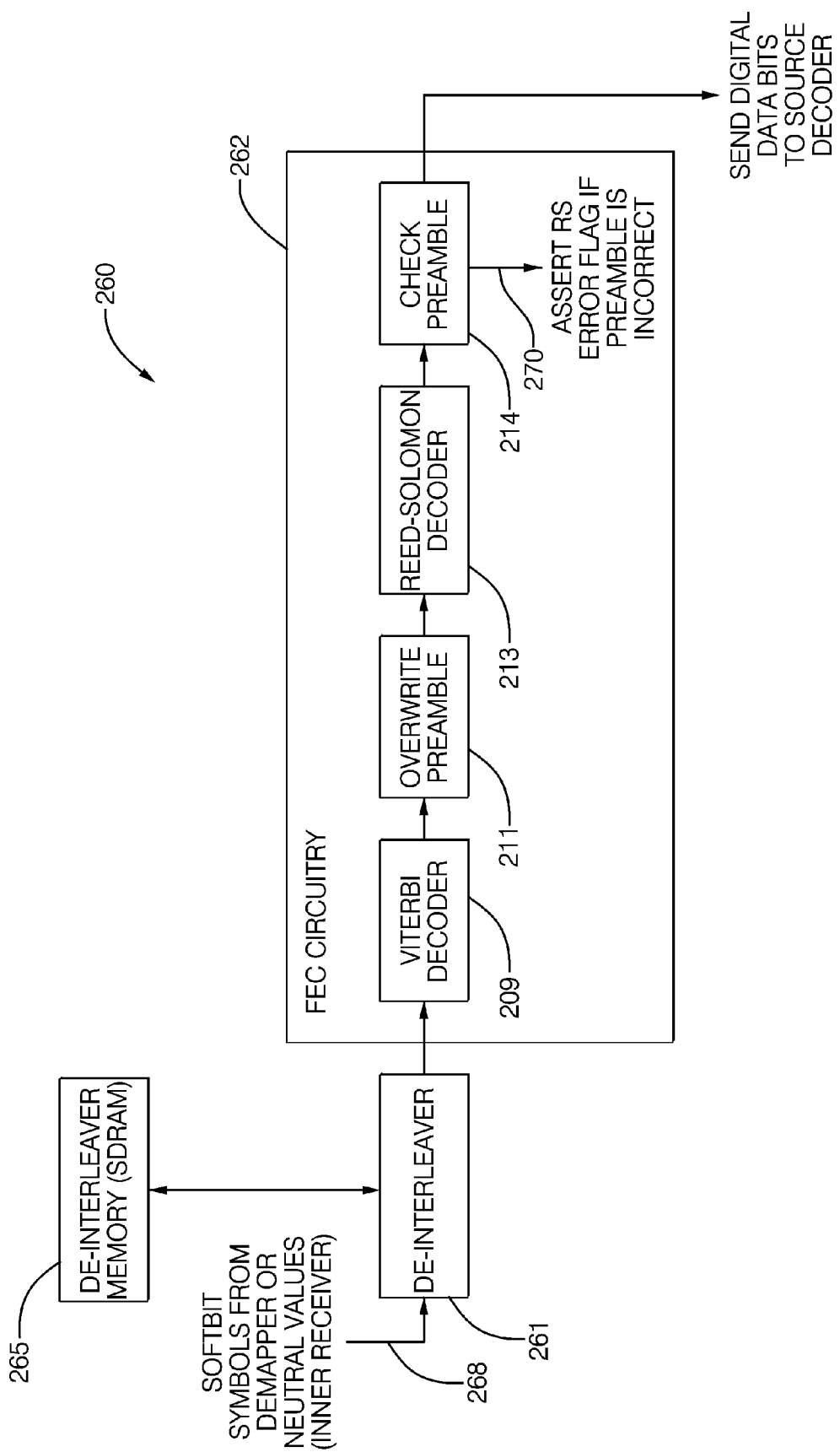
FIG. 9 shows an outer receiver portion of a DSP of a satellite receiver that includes FEC circuitry that has a Reed-Solomon (RS) decoder, according to a another alternate embodiment of the invention.

Referring to FIG. 9, according to another alternate embodiment of the invention, an outer receiver portion 260 of the DSP includes FEC circuitry 262 that further contains a Verterbi decoder 209 and a Reed-Solomon (RS) decoder 213 in signal path 268. Elements that are similar to the embodiment of FIG. 4 have reference numerals that differ by 200. FEC circuitry 262 further includes an overwrite preamble block 211 and a check preamble block 214.

Figure 10:
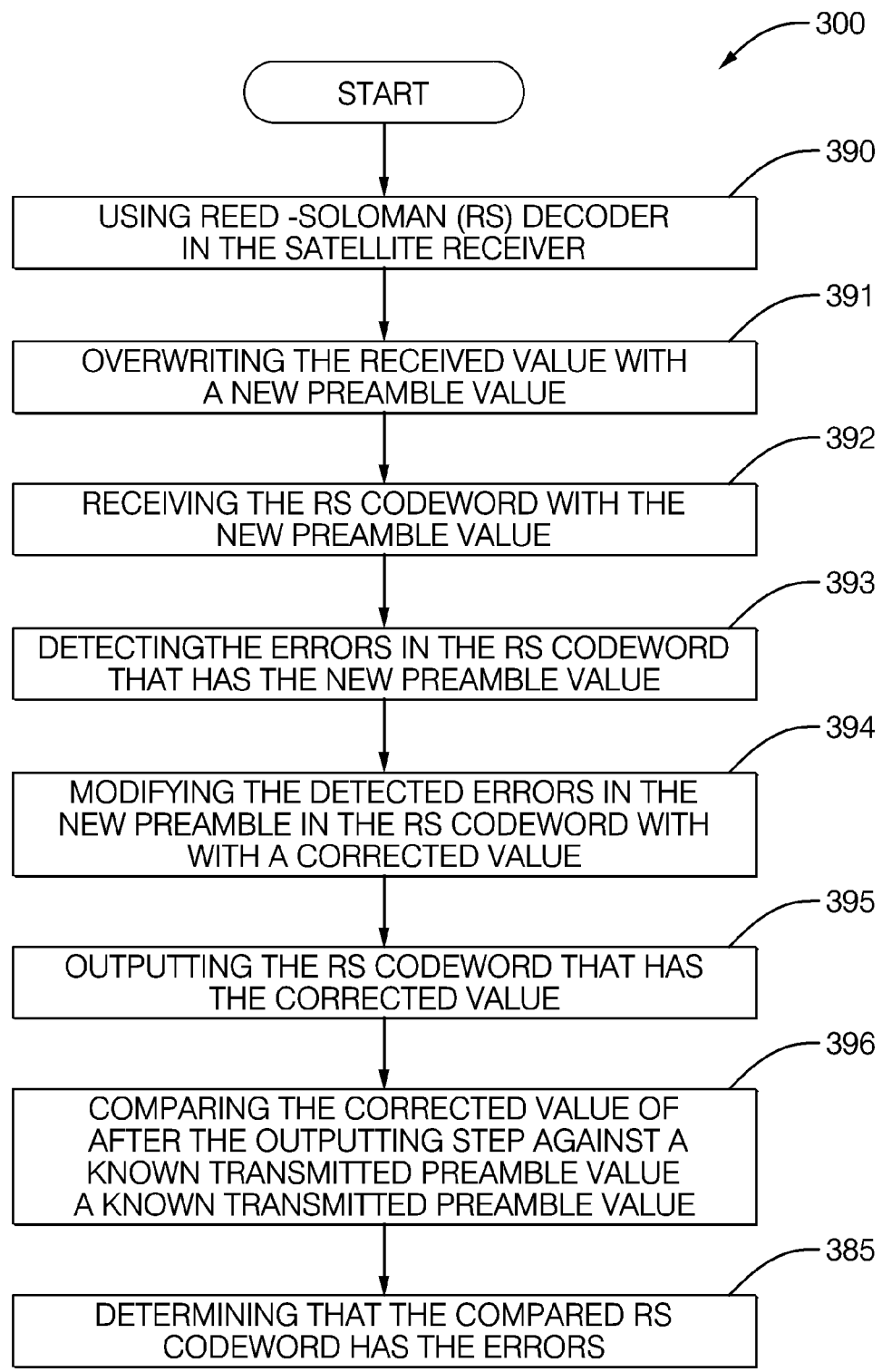
FIG. 10A shows a method that determines baseband signal errors in the FEC circuitry of FIG. 9 when neutral data values are input into the LTI circuitry.
FIG. 10B shows a method that determines baseband signal errors in the FEC circuitry of FIG. 9 when neutral data values are not input into the LTI circuitry.
Figure 10:
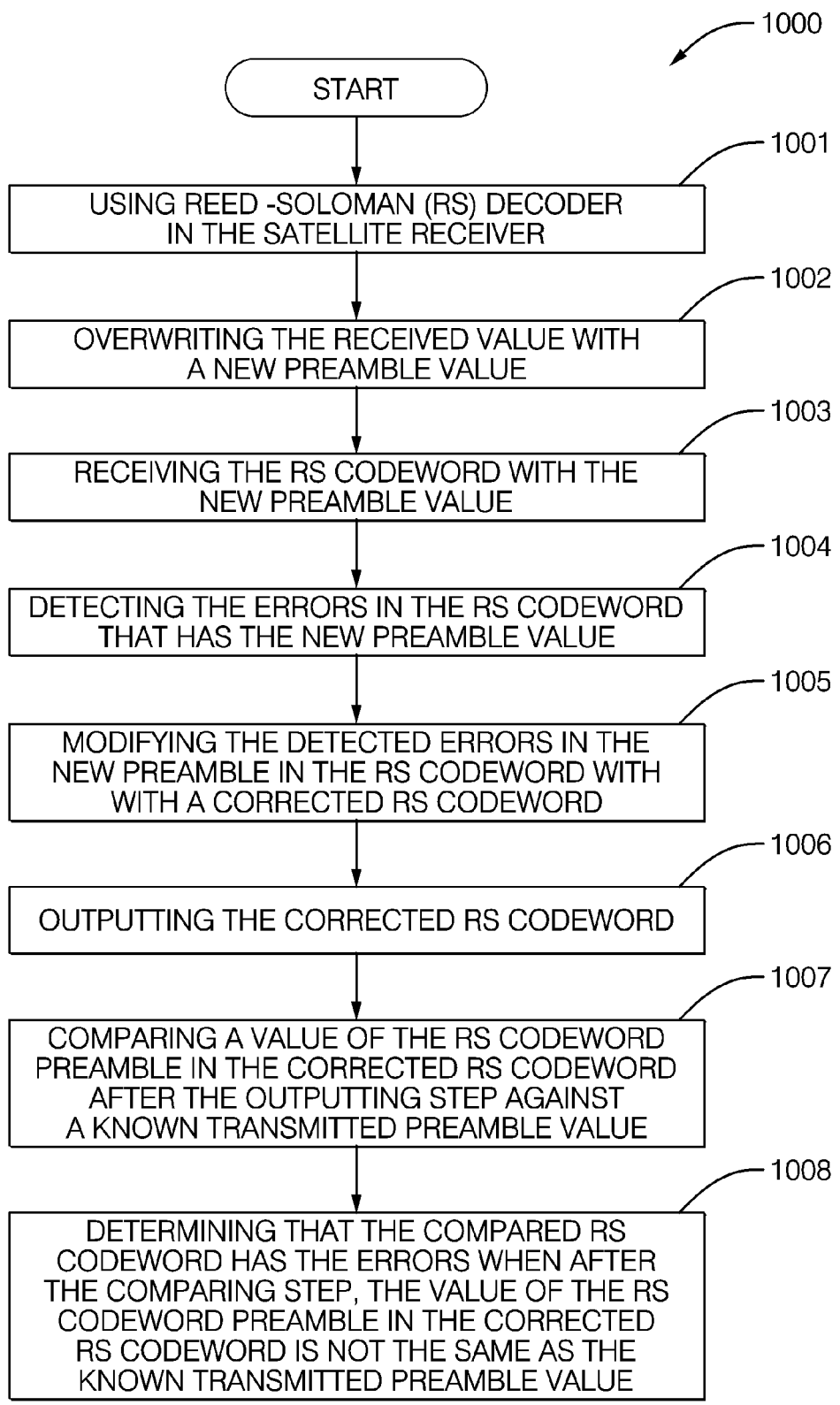

Referring to FIG. 10A, a method 300 illustrates a method of operation of FEC circuitry 262 when neutral data values are injected in to LTI circuitry 261, such as is illustrated in the embodiment of FIG. 4. One step 390 in method 300 is using a Reed-Solomon (RS) decoder 213 disposed in the satellite receiver having at least one input and at least one output. RS decoder 213 is configured to receive a RS codeword and the RS codeword includes a RS codeword preamble having a received value. Another step 391 in method 300 is overwriting the received value with a new preamble value that is a same value as a known transmitted value external to RS decoder 213 by the satellite receiver. A further step 392 in method 300 is receiving the RS codeword with the new preamble value in to RS decoder 213 at an input of RS decoder 213. Another step 393 in method 300 is detecting for errors in the RS codeword that has the new preamble value in RS decoder 213. A further step 394 in method 300 is modifying said detected errors in the new preamble value in the RS codeword with a corrected value. Another step 395 in method 300 is outputting the RS codeword that has the corrected value after the modifying step. A further step 396 in method 300 is comparing the corrected value of the RS codeword after the outputting step against a known transmitted preamble value. Another step 385 in method 300 is determining that the compared RS codeword has the errors by the satellite receiver when, after the comparing step, the corrected value disposed in the RS codeword preamble is not the same as the known transmitted preamble value.

In method 300, the received data value is 0x00 and the received data value of 0x00 is overwritten by the neutral data value that is a zero (0) value. The new preamble data value is 0x1d and the corrected data value is 0x00. The known transmitted preamble value is 0x1d.

Referring to FIG. 10B, when neutral data value is not being injected in to LTI circuitry 261, FEC circuitry 262 operates according to method 1000. A first step 1001 in method 1000 is using a Reed-Solomon (RS) decoder 213 disposed in the satellite receiver having at least one input and at least one output. RS decoder 213 is configured to receive a RS codeword and the RS codeword includes a RS codeword preamble that has a received value. Another step 1002 of method 1000 is overwriting the received value with a new preamble value that is a same value as a known transmitted value external to RS decoder 213 by the satellite receiver. A further step 1003 of method 1000 is receiving the RS codeword with the new preamble value in to RS decoder 213 at an input of RS decoder 213. Another step 1004 in method 1000 is detecting for errors in the RS codeword that has the new preamble value in RS decoder 213. A further step 1005 in method 1000 is modifying the detected errors in the in the RS codeword with a corrected RS codeword. A further step 1006 in method 1000 is outputting the corrected RS codeword from RS decoder 213 after the modifying step. Another step 1007 in method 1000 is comparing a value of the RS codeword preamble in the corrected RF codeword by the satellite receiver after the outputting step against a known transmitted preamble value that is understood by the satellite receiver. A further step 1008 in method 1000 is determining that the compared RS codeword has the errors by the satellite receiver when, after the comparing step, the value of the RS codeword preamble in the corrected RS codeword is not the same as the known transmitted preamble value.

An RS error flag 270 is respectfully set by the satellite receiver when the correct preamble of the RS codeword is not found at the output of the RS decoder by the satellite receiver or when the value of the RS codeword preamble in the corrected RS codeword is not the same as the known transmitted preamble value. The transmitted preamble of the RS codeword is a first byte of the RS codeword.

If the source decoder of the satellite receiver accurately knows if digital baseband data has errors, less severe mutes can occur because the error concealment algorithms are triggered to process the error data. This ensures a better listening experience for the user or operator of the satellite receiver.

Referring to FIGS. 11-15, according to yet another embodiment of the invention, a satellite receiver 413 is configured with a zero-IF (ZIF) tuner. The ZIF tuner satellite receiver includes LTI device circuitry (not shown) and FEC circuitry (not shown), a zero-IF tuner 429, and a plurality of DC frequency bins 755, 855. ZIF satellite receiver 413 downconverts the satellite channel of interest to a baseband DC signal in a single stage. For frequency and phase modulated signals, down-conversion must provide quadrature outputs so as to avoid loss of information contained in the received satellite RF signals.

Figure 11:
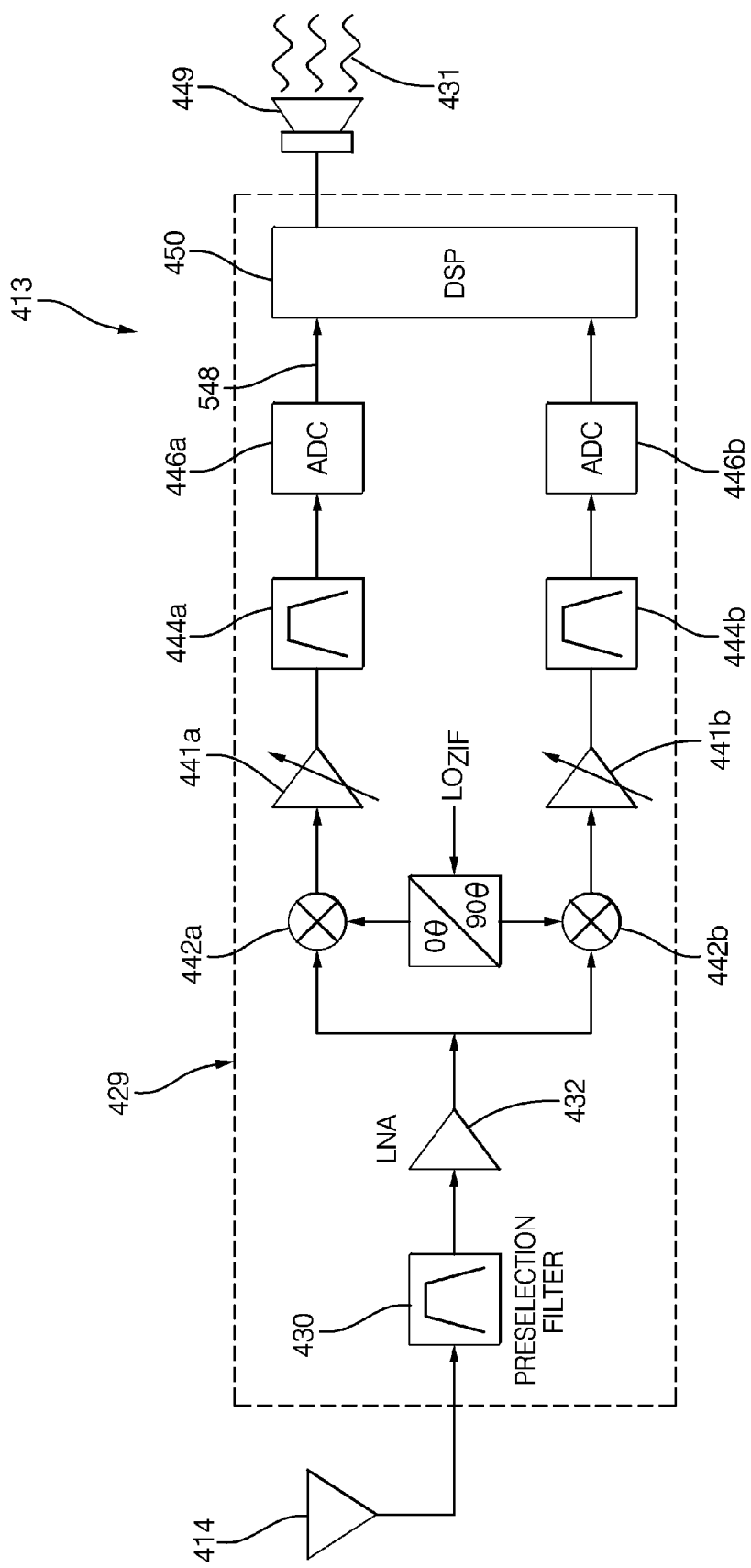
FIG. 11 shows a block diagram of a front end of a satellite receiver that includes a ZIF tuner, according to yet a further alternate embodiment of the invention.

Referring to FIG. 11, showing front end 429 of ZIF satellite receiver 413 is also further configured to receive satellite RF signals similar to satellite RF signals 25 as illustrated in FIG. 1. The satellite RF signals are received at antenna 414 and coupled in to ZIF satellite receiver 413. A portion of the broadcasted satellite band received by the satellite receiver is selected using preselection filter 430 and gain is added to these preselected RF signals by electrically passing through LNA 432. The baseband signal is then split and respectively phase shifted by zero (0) degrees and 90 degrees at phase shift mixers 442a, 442b that are operatively supplied with local oscillator frequency $LO_{ZIF}$. The phase shifted baseband signals are passed through a selectable gain block 441a, 441b and subsequently low passed filtered at LPFs 444a, 444b. The analog baseband signals are converted to corresponding digital baseband signals by respective analog-to-digital (A/D) converters 446a, 446b that then feed into inputs of a DSP 450. Listenable audio signals emit from a speaker 449 to provide a listenable audio stream 431 of the received satellite RF signals that are processed by ZIF tuner satellite receiver 413. In contrast to the superheterdyne satellite receiver of FIG. 3, ZIF tuner satellite receiver 413 may have less hardware circuitry, does not need an IR filter, and does not need an IF stage so that low pass filtering is sufficient. A weakness of ZIF tuners is a tendency of $LO_{ZIF}$ frequency leakage due to the imperfect isolation between the LO port and the ports of respective mixers 442a, 442b and LNA 432 due to capacitive and substrate electrical coupling. The LO leakage may also self-mix with the original LO signal and produce undesired DC offset voltages that cause listenable audio frequency disruptions that emit from speaker 449.

Figure 12:
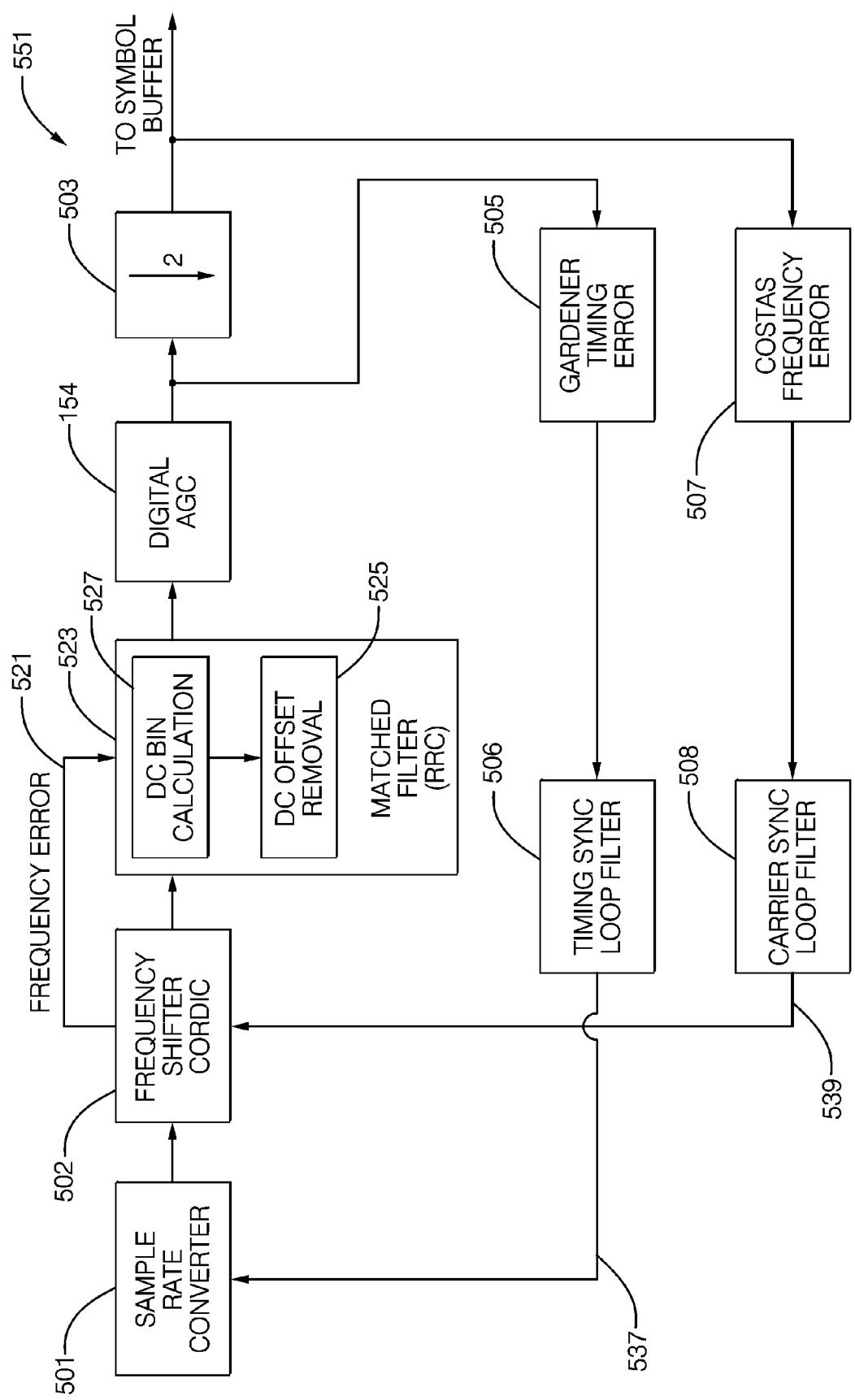
FIG. 12 shows an inner receiver portion of a DSP in the ZIF tuner satellite receiver of FIG. 11, and details thereof.

Referring to FIG. 12, an inner receiver portion 551 of DSP 450 includes timing loops 537, 539. In contrast to the embodiment of FIG. 7, error blocks 505, 507 directly respective electrically communicate with loop filters 506, 508. Matched filter block 523 also includes a DC offset removal block 525 and a DC bin calculation block 527. DC bin calculation block 527 receives a frequency error signal 521 from frequency shifter CORDIC block 502 that activated DC bin calculation block 527 to identify the correct DC frequency bins to remove the DC offset error. DC bin calculation block 527 electrically communicates with DC offset removal block that injects the zero value in the DC frequency bins identified by the DC bin calculation block 527. The matched filter block 523 is implemented in the frequency domain instead of the normal time domain filter implementation. First, a fast Fourier transform (FFT) is done on the input signal to transform the data from the time domain to the frequency domain. Following the FFT, the DC offset removal block can simply zero out the DC frequency bin(s) where the DC offset noise is located. Next, the signal is filtered by a simple multiplication step with the matched filter coefficients. Lastly, the frequency domain filtered signal is then transformed back to the time domain with the use of an IFFT.

Figure 13:
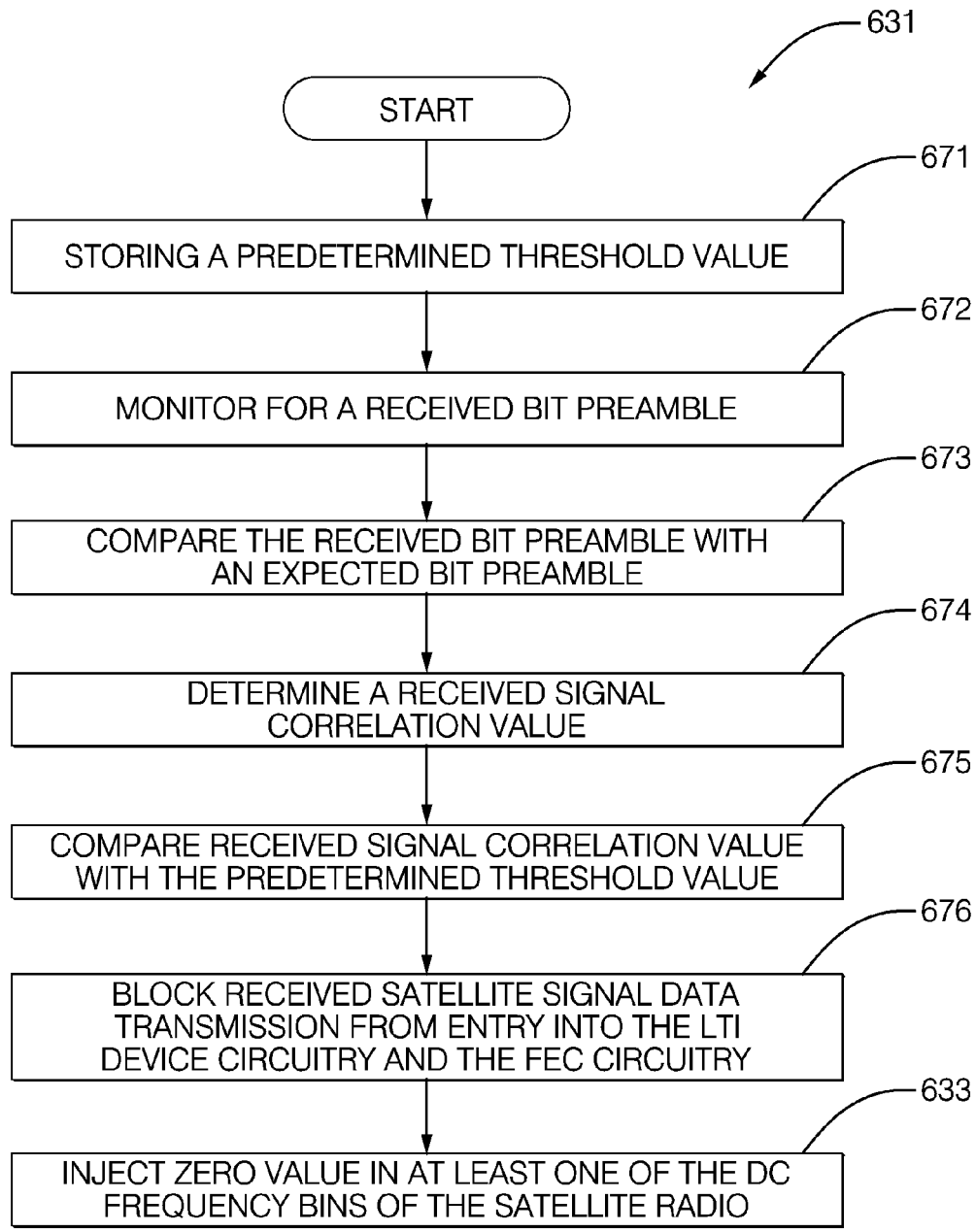
FIG. 13 shows a method to reduce listenable audio frequency interruptions using the ZIF tuner satellite receiver of FIG. 11.

Referring to FIG. 13, a method 631 is presented to reduce listenable audio frequency disruptions. Steps 671-676 are similar to steps 71-76 of method 70 as illustrated in the embodiment of FIG. 4 previously described herein. In addition to steps 671-676, method 631 includes a further step 633, that includes injecting a zero value 757, 857 in at least one of the DC frequency bins in the plurality of DC frequency bins 755, 855 that correspond to a DC offset noise 753, 853 injected in a signal path 548, 568 of ZIF tuner satellite receiver 413 such that DC offset noise 753, 853 is mitigated. A local oscillator (LO) frequency $LO_{ZIF}$ is analyzed and a satellite RF center frequency in a frequency offset algorithm disposed in the satellite receiver in relation to the DC offset noise 753, 853 such that an output of the frequency offset algorithm includes an offset value. This offset value is associated with frequency error signal 521 illustrated in FIG. 12. The offset value is matched to at least one DC frequency bin in the plurality of DC frequency bins 753, 853 that correspond to the offset value and zero value 757, 857 is injected by ZIF tuner satellite receiver 413 in the at least one DC frequency bin where DC offset noise 753, 853 is disposed.

FIG. 14A shows plurality of DC frequency bins 755 numbered sequentially from −4 to +4. DC offset noise spike 753 is disposed in baseband signal 751 in DC frequency bin #2. FIG. 14B shows DC bin #2 zeroed out with zero value 757.

Referring to FIGS. 15A and 15B, DC offset noise spike 853 has a wider breadth so as to cross a plurality of sequential DC frequency bins 855 in contrast to DC offset noise spike 753 shown in FIG. 14A. Wider DC offset noise spike 855 crosses DC frequency bins #0-2. In this scenario, DC frequency bin #1 is a central DC frequency bin 865 where DC offset noise spike 853 is centered. DC frequency bin #0 and #2 are flanking DC frequency bins 867 that adjacently flank central DC frequency bin 865 and contain the left and right tails of DC offset noise spike 853.

Mitigating the DC offset noise as previously described above advantageously results in less undesired mutes that may be heard by the operator.

The embodiments as shown in FIGS. 1-15 are not in use when a power supply of the corresponding satellite receivers of these embodiments is not electrically connected and thus, cannot be electrically operative.

The embodiments as shown in FIGS. 1-15 are in use when the satellite receivers of these embodiments are in electrical communication antenna 14 and power is supplied to allow electrical operation of these satellite receivers. If the operator of the satellite receiver that contains one or more of the various embodiments described herein operatively turns the receiver ON from an OFF position, such as may be done with a button or knob disposed on the satellite receiver, audio frequencies are listenable the emit from the speakers of these satellite receivers.

Alternately, the features and functions associated with a single DSP as described may be divided and partitioned in the satellite receiver and are only limited by the creative imagination of the artesian in the satellite receiver arts. For instance, the FEC circuitry may be remote from the DSP. In another embodiment, the FEC circuitry and the LTI circuitry may be remote from the DSP.

Alternately, the received satellite signal data transmission may be blocked when the received correlation value may be less than the predetermined threshold value and when the received satellite signal data transmission is the same as, or greater than the predetermined threshold value the received satellite signal data transmission is allowed to be input to the LTI and the FEC circuitry.

Alternately, the enhancements as described herein may be implemented as distinct enhancements or in combination as electrical requirements dictate in an electrical application. While the enhancements as described herein and shown in the drawings preferably apply to a single carrier satellite system, it should be understood that within the spirit and scope of the invention, these enhancements also extend to alternative multi-carrier satellite systems. Multi-carrier satellites may employ different supporting circuitry than that used for a single carrier satellite system. For instance, referring to FIG. 7, a multi-carrier satellite system may employ error blocks that are different from the Gardner timing error block and the Costas Frequency/Phase error block.

A robust satellite receiver that further enhances a quality listenable audio stream for an operator of the satellite receiver has been presented. The satellite receiver has enhanced long time interleaving performance when traveling through a tunnel. This is done by maximizing the effective interleaver depth by not inserting noisy data for digital signal processing in to the LTI device circuitry. During weak signal conditions, neutral data values are transmitted by the satellite receiver in to the LTI device circuitry instead of a noisy baseband signal. This keeps the noisy baseband signal from being processed by the FEC circuitry so that the effective interleaver depth is maximized. A maximized interleaver depth allows the operator of the satellite radio to have an increased amount of time for a quality listenable audio stream to be heard before an undesired defective audio stream may occur, as may frequently occur when a vehicle drives through a tunnel. The satellite receiver has increased weak-to-strong signal performance by using only good values that represent a known good strong signal condition that are used in the frequency and timing loops in the inner receiver portion of the DSP when the satellite receiver enters a succeeding strong signal condition that follows a weak signal condition of the satellite receiver. When the frequency and timing loops operate with known good values, this ensures more good data is received at the LTI device circuitry instead of undesired noisy baseband signal data. This loop enhancement further assists to maximize the effective interleaver depth and further reduce the possible mutes from occurring. The satellite receiver includes Reed-Solomon (RS) codeword error checking to prevent erroneous baseband signal data from being accepted as good baseband signal data which may lessen the probability for undesired mutes to occur that may be heard by the operator of the satellite receiver. This RS codeword error checking enhancement is especially useful when neutral data values are inserted in to the LTI circuitry. When the neutral data value has zero value, the zero value is accepted as a good RS codeword. However, the neutral data value may be associated with a weak signal condition of the satellite receiver where it is desired to not process the baseband signal. Comparison of at least a portion of the RS codeword against a known portion of the RS codeword where the values are different as determined by the satellite receiver ensures the satellite receiver will appropriately set an RS error flag. When a satellite receiver includes a ZIF tuner, zero values injected by the satellite receiver into identified DC frequency bins eliminate undesired DC offset noise to lessen the probability that mutes might occur and be heard by the operator of the satellite receiver.

While this invention has been described in terms of the embodiments thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its embodiment(s), it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A method to reduce listenable audio frequency interruptions that emit from a satellite receiver, the satellite receiver including long time interleaver (LTI) device circuitry and forward error correction (FEC) circuitry and configured to receive satellite radio frequency (RF) signals, the method comprising:
   storing a predetermined threshold value based on an electric parameter associated with the received satellite RF signals in a memory of the satellite receiver;
   monitoring a received bit preamble associated with said received satellite RF signals by the satellite receiver;
   comparing said received bit preamble with an expected preamble by the satellite receiver;
   determining a received signal correlation value associated with the received bit preamble in relation to the expected preamble by the satellite receiver;
   comparing the received signal correlation value to the predetermined threshold value stored in the memory by the satellite receiver; and
   blocking received satellite signal data transmission from entry in to an input of the LTI device circuitry by the satellite receiver when the received signal correlation value is the same as, or less than the predetermined threshold value.

2. The method according to claim 1, wherein the steps in the method occur in the order recited.

3. The method according to claim 1, further including,
   inputting said received satellite signal data transmission in to the input of the LTI device circuitry and the input of the FEC circuitry by the satellite receiver when the received signal correlation value is greater than the predetermined threshold value.

4. The method according to claim 1, wherein the step of storing the predetermined threshold value further includes,
receiving the received satellite RF signals in the satellite receiver,
confirming that at least one of the received satellite RF signals has a quality listenable audio stream,
manipulating the at least one of the received satellite RF signals as a sufficiently weak received satellite RF signal having a minimum quality listenable audio stream state that occurs just before the quality listenable audio stream transitions to a defective listenable audio stream, and
determining the predetermined threshold value based on said minimum quality listenable audio stream state,
wherein said minimum quality listenable audio stream state is said electric parameter.

5. The method according to claim 1, wherein the step of blocking said received satellite signal data transmission from entry in to the LTI device circuitry further includes,
blocking said received satellite data transmission from entry in to the FEC circuitry.

6. The method according to claim 1, wherein the step of blocking said received satellite signal data transmission further includes,
injecting a neutral data value respectively into the LTI circuitry and the FEC circuitry by the satellite receiver when the satellite receiver performs the step of blocking said received satellite signal data transmission.

7. The method according to claim 6, wherein the neutral data value comprises a soft bit word that has a discrete digital value that has zero weight.

8. The method according to claim 6, further including,
using a Reed-Solomon (RS) decoder disposed in the satellite receiver having at least one input and at least one output, the RS decoder configured to receive a RS codeword, the RS codeword comprising a RS codeword preamble that has a received value,
overwriting the received value with a new preamble value that is a same value as a known preamble transmitted value external to the RS decoder by the satellite receiver,
receiving the RS codeword with the new preamble value in to the RS decoder at the input of the RS decoder,
detecting for errors in the RS codeword that has the new preamble value in the RS decoder,
modifying said detected errors in the new preamble value in the RS codeword with a corrected value,
outputting the RS codeword that has the corrected value after the modifying step,
comparing the corrected value of the RS codeword after the outputting step against the known transmitted preamble value, and
determining that the compared RS codeword has said errors by the satellite receiver when, after the comparing step, the corrected value disposed in the RS codeword preamble is not the same as the known transmitted preamble value.

9. The method according to claim 8, further including,
setting an RS error flag by the RS decoder after the determining step.

10. The method according to claim 8, wherein the RS codeword preamble is a first byte of the RS codeword.

11. The method according to claim 8, wherein
the received value is 0x00, whereby the received value of 0x00 is a result of the neutral data value comprising zero (0) values,
the new preamble value is 0x1d,
the corrected value is 0x00, and
the known transmitted preamble value is 0x1d.

12. The method according to claim 1, further including,
using a Reed-Solomon (RS) decoder disposed in the satellite receiver having at least one input and at least one output, the RS decoder configured to receive a RS codeword, the RS codeword comprising a RS codeword preamble that has a received value,
overwriting the received value with a new preamble value that is a same value as a known transmitted preamble value external to the RS decoder by the satellite receiver,
receiving the RS codeword with the new preamble value in to the RS decoder at the input of the RS decoder,
detecting for errors in the RS codeword that has the new preamble value in the RS decoder,
modifying said detected errors in the in the RS codeword with a corrected RS codeword,
outputting the corrected RS codeword after the modifying step,
comparing a value of the RS codeword preamble in the corrected RS codeword after the outputting step against the known transmitted preamble value, and
determining that the compared RS codeword has said errors by the satellite receiver when, after the comparing step, the value of the RS codeword preamble in the corrected RS codeword is not the same as the known transmitted preamble value.

13. The method according to claim 1, further including,
setting an error flag by the satellite receiver when a value of at least a portion of an RS codeword at an output of a RS decoder disposed in the satellite receiver is not a same value as a known value recognized by the satellite receiver.

14. The method according to claim 13, wherein the step of blocking said received satellite signal data transmission further includes,
injecting a neutral data value respectively into the FEC circuitry by the satellite receiver when the satellite receiver performs the step of blocking said received satellite signal data transmission so that the step of setting the error flag occurs when the neutral data value is injected into the FEC circuitry,
wherein said value of at least the portion of the RS codeword is in relation to said neutral data value, said portion being a RS codeword preamble.

15. The method according to claim 1, further including,
detecting a first strong received satellite RF signal condition by the satellite receiver,
monitoring symbol timing data of a timing loop disposed in the satellite receiver by the satellite receiver when the satellite receiver is in the first strong signal condition,
storing said symbol timing data in a storage memory of the satellite receiver by the satellite receiver,
detecting a weak received satellite RF signal condition by the satellite receiver,
retrieving said stored symbol timing data from the storage memory by the satellite receiver when the satellite receiver is in said weak signal condition,
holding the timing loop in a static state by the satellite receiver during said weak signal condition with said stored symbol timing data,
detecting a second strong received satellite RF signal condition after said step of detecting said weak signal condition, and
resuming a normal operation of the timing loop with the stored symbol timing data after the step of detecting said second strong signal condition.

16. The method according to claim 1, further including,
detecting a first strong received satellite RF signal condition by the satellite receiver,
monitoring frequency data of a frequency loop disposed in the satellite receiver by the satellite receiver when the satellite receiver is in the first strong signal condition,
storing said frequency data in a storage memory of the satellite receiver by the satellite receiver,
detecting a weak received satellite RF signal condition by the satellite receiver,
retrieving said stored frequency data from the storage memory by the satellite receiver when the satellite receiver is in said weak signal condition,
holding the frequency loop in a static state by the satellite receiver during said weak signal condition with said stored frequency data,
detecting a second strong received satellite RF signal condition after said step of detecting said weak signal condition, and
resuming a normal operation of the frequency loop with the stored frequency data after the step of detecting said second strong signal condition.

17. The method according to claim 1, further including,
detecting a first strong received satellite RF signal condition by the satellite receiver,
monitoring symbol timing data of a timing loop and frequency data of a frequency loop disposed in the satellite receiver by the satellite receiver when the satellite receiver is in the first strong signal condition,
storing said symbol timing data and said frequency data in a storage memory of the satellite receiver by the satellite receiver,
detecting a weak received satellite RF signal condition by the satellite receiver,
retrieving said stored symbol timing data and said stored frequency data from the storage memory by the satellite receiver when the satellite receiver is in said weak signal condition,
holding the timing loop and the frequency loop in a static state by the satellite receiver during said weak signal condition with said respective stored symbol timing data and said frequency data,
detecting a second strong received satellite RF signal condition after said step of detecting said weak signal condition, and
resuming a normal operation of the timing loop and the frequency loop with the respective stored symbol timing data and the stored frequency data after the step of detecting said second strong signal condition.

18. The method according to claim 17, wherein the timing loop and the frequency loop are disposed up-stream of, and in electrical communication with said LTI device circuitry and said FEC circuitry.

19. The method according to claim 1, wherein the satellite receiver is disposed in a motorized vehicle.

20. A method to reduce listenable audio frequency interruptions that emit from a satellite receiver, the satellite receiver including long time interleaver (LTI) device circuitry and forward error correction (FEC) circuitry, a zero-intermediate frequency (ZIF) tuner, and a plurality of DC frequency bins and is configured to receive satellite radio frequency (RF) signals, the method comprising:
storing a predetermined threshold value based on an electric parameter associated with the received satellite RF signals in a memory of the satellite receiver;
monitoring a received bit preamble associated with said received satellite RF signals by the satellite receiver;
comparing said received bit preamble with an expected preamble by the satellite receiver;
determining a received signal correlation value associated with the received bit preamble in relation to the expected preamble by the satellite receiver;
comparing the received signal correlation value to the predetermined threshold value stored in the memory by the satellite receiver;
blocking received satellite signal data transmission from entry in to an input of the LTI device circuitry by the satellite receiver when the received signal correlation value is the same as, or less than the predetermined threshold value; and
injecting a zero value in at least one DC frequency bin in the plurality of DC frequency bins that correspond to a DC offset noise injected in a signal path of said satellite receiver such that the DC offset noise is mitigated so that said listenable audio frequency interruptions are reduced.

21. The method according to claim 20, further including,
inputting said received satellite signal data transmission in to the input of the LTI circuitry and in to the input of the FEC circuitry by the satellite receiver when the received signal correlation value is greater than the predetermined threshold value.

22. The method according to claim 20, further including,
analyzing a local oscillator (LO) frequency and a satellite RF center frequency in a frequency offset algorithm disposed in the satellite receiver in relation to said DC offset noise such that an output of the frequency offset algorithm includes an offset value,
matching the offset value to at the at least one DC frequency bin that corresponds to the offset value, and
injecting the zero value in the at least one DC frequency bin by the satellite receiver.

23. The method according to claim 22, wherein the step of injecting the zero value further includes the at least one DC frequency bins having a central DC frequency bin flanked by one or more DC frequency bins disposed sequentially adjacent the central DC frequency bin, the method further including,
injecting the zero value in the central DC frequency bin and the flanked one or more DC frequency bins.

* * * * *